United States Patent
Fukumitsu

(10) Patent No.: US 7,605,344 B2
(45) Date of Patent: Oct. 20, 2009

(54) LASER BEAM MACHINING METHOD, LASER BEAM MACHINING APPARATUS, AND LASER BEAM MACHINING PRODUCT

(75) Inventor: Kenshi Fukumitsu, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 231 days.

(21) Appl. No.: 10/564,840

(22) PCT Filed: Jul. 16, 2004

(86) PCT No.: PCT/JP2004/010224

§ 371 (c)(1),
(2), (4) Date: Sep. 15, 2006

(87) PCT Pub. No.: WO2005/007335

PCT Pub. Date: Jan. 27, 2005

(65) Prior Publication Data

US 2007/0170159 A1   Jul. 26, 2007

(30) Foreign Application Priority Data

Jul. 18, 2003 (JP) ............................. 2003-277039

(51) Int. Cl.
*B23K 26/38* (2006.01)
*H01L 21/301* (2006.01)
(52) U.S. Cl. ................... 219/121.72; 438/463
(58) Field of Classification Search ........... 438/463, 438/33, 113, 460, 462; 219/121.67, 121.68, 219/121.69, 121.72; 264/400, 482
See application file for complete search history.

(56) References Cited

U.S. PATENT DOCUMENTS

| 3,629,545 | A | 12/1971 | Graham et al. |
| 4,562,333 | A | 12/1985 | Taub et al. |
| 5,211,805 | A | 5/1993 | Srinivasan |
| 5,254,833 | A | 10/1993 | Okiyama |
| 5,543,365 | A | 8/1996 | Wills et al. |
| 5,622,540 | A | 4/1997 | Stevens |

(Continued)

FOREIGN PATENT DOCUMENTS

EP   1 649 965 A1   4/2006

(Continued)

OTHER PUBLICATIONS

K. Arai, "Handotai Wafer ni Okeru Laser Dicing Kako," Journal of the Japan Society of Griding Engineering, vol. 47, No. 5, May 2003, pp. 229-231, with English translation.

(Continued)

*Primary Examiner*—Geoffrey S Evans
(74) *Attorney, Agent, or Firm*—Drinker Biddle & Reath LLP

(57) ABSTRACT

It is an object to provide a laser beam machining method which can easily cut a machining target. The laser beam machining method irradiates laser light while positioning a focus point at the inside of a machining target to thereby form a treated area based on multiphoton absorption along a planned cutting line of the machining target inside the machining target and also form a minute cavity at a predetermined position corresponding to the treated area in the machining target.

38 Claims, 20 Drawing Sheets

U.S. PATENT DOCUMENTS

| | | | |
|---|---|---|---|
| 5,637,244 | A | 6/1997 | Erokhin |
| 5,776,220 | A | 7/1998 | Allaire et al. |
| 5,826,772 | A | 10/1998 | Ariglio et al. |
| 6,055,829 | A | 5/2000 | Witzmann et al. |
| 6,211,488 | B1 | 4/2001 | Hoekstra et al. |
| 6,252,197 | B1 | 6/2001 | Hoekstra et al. |
| 6,257,224 | B1 | 7/2001 | Yoshino et al. |
| 6,259,058 | B1 | 7/2001 | Hoekstra |
| 6,322,958 | B1 | 11/2001 | Hayashi |
| 6,420,678 | B1 | 7/2002 | Hoekstra |
| 6,489,588 | B1 | 12/2002 | Hoekstra et al. |
| 6,992,026 | B2 * | 1/2006 | Fukuyo et al. ............. 438/463 |
| 2002/0006765 | A1 | 1/2002 | Michel et al. |
| 2003/0024909 | A1 | 2/2003 | Hoekstra et al. |
| 2004/0002199 | A1 | 1/2004 | Fukuyo et al. |
| 2004/0124563 | A1 * | 7/2004 | Fleming et al. ............. 264/482 |

FOREIGN PATENT DOCUMENTS

| | | | |
|---|---|---|---|
| JP | 46-24989 | | 7/1971 |
| JP | 60-055640 | A | 3/1985 |
| JP | 61-112345 | A | 5/1986 |
| JP | 03-234043 | A | 10/1991 |
| JP | 04-111800 | A | 4/1992 |
| JP | 04-356942 | A | 12/1992 |
| JP | 07-037840 | A | 2/1995 |
| JP | 07-040336 | A | 2/1995 |
| JP | 10-163780 | A | 6/1998 |
| JP | 10-305420 | A | 11/1998 |
| JP | 11-138896 | A | 5/1999 |
| JP | 11-163403 | A | 6/1999 |
| JP | 11-177137 | A | 7/1999 |
| JP | 11-221684 | A | 8/1999 |
| JP | 11-267861 | | 10/1999 |
| JP | 11-267861 | A | 10/1999 |
| JP | 2000-015467 | A | 1/2000 |
| JP | 2000-104040 | A | 4/2000 |
| JP | 2000-195828 | A | 7/2000 |
| JP | 2000-219528 | A | 8/2000 |
| JP | 2001-250798 | A | 9/2001 |
| JP | 2002-050589 | A | 2/2002 |
| JP | 2002-158276 | A | 5/2002 |
| JP | 2002-192370 | A | 7/2002 |
| JP | 2002-226796 | A | 8/2002 |
| JP | 2003-001458 | A | 1/2003 |
| JP | 2003-154517 | | 5/2003 |
| JP | 2003-154517 | A * | 5/2003 |
| WO | 02/22301 | A | 3/2002 |
| WO | WO 02/072489 | A2 | 9/2002 |

OTHER PUBLICATIONS

F. Fukuyo et al., "Stealth Dicing Technology for Ultra Thin Wafer", presented at 2003 ICEP (International Conference on Electronics Packaging), Apr. 16-18, 2003, Tokyo, Japan.

K. Midorikawa, "Recent Progress of Femtosecond Lasers and Their Applications to Material Processing", Dai 45 Kai Laser Netsukako Kenkyukai Ronbunshu, Dec. 1998, pp. 29-38, with English abstract.

T. Sano et al., "Ultrashort Pulse Laser Microprocessing of Silicon", Japan Welding Society Zenkoku Taikai Koen Gaiyo, Mar. 2000, pp. 72-73, with English translation.

K. Miura et al., "Formation of Photo-induced Structures in Glasses with Femtosecond Laser," Dai 42 Kai Laser Netsukako Kenkyukai Ronbunshu, Nov. 1997, pp. 107, line 4 to pp. 109, line 5, with English abstract.

K. Hayashi, "Inner Glass Marking by Harmonics of Solid-state Laser", Dai 45 Kai Laser Netsukako Kenkyukai Ronbunshu, Dec. 1998, pp. 23-28, with English abstract.

"Proceedings of the 63$^{rd}$ Laser Materials Processing Conference", May 2005, pp. 115-123, with English translation.

The 6$^{th}$ International Symposium on Laser Precision Microfabrication, Apr. 2005, Symposium Program and Technical Digest.

"Journal of Japan Laser Processing Society", vol. 12, No. 1, Feb. 2005, pp. 17-23, with English translation.

T. Miyazaki, "Laser Beam Machining Technology," Published by Sangyo-Tosho Inc., May 31, 1991, First Edition. pp. 9-10, with English translation.

T. Yajima et al., New Version Laser Handbook, published by Asakusa Shoten, Jun. 15, 1989, pp. 666-669, with English translation.

Tooling Machine Series, Laser Machining, published by Taiga Shuppan, Inc., Sep. 10, 1990, pp. 91-96, with English translation.

Electronic Material No. 9, on 2002, published by Kogyo Chousakai, pp. 17-21, with English translation.

* cited by examiner

Fig.12

| PULSE PITCH (μm) | | 1.00 | 2.00 | 3.00 | 4.00 | 5.00 | 6.00 | 7.00 |
|---|---|---|---|---|---|---|---|---|
| MACHINING DEPTH (mm/sec) | | 75 | 150 | 225 | 300 | 250 | 300 | 280 |
| FREQUENCY (kHz) | | 75 | 75 | 75 | 75 | 50 | 50 | 40 |
| PULSE WIDTH (nsec) | | 170 | 170 | 170 | 170 | 161 | 161 | 152 |
| MACHINING DEPTH (μm) | 45 | HC MOUNTAIN, △ | HC MOUNTAIN, △ | HC MOUNTAIN, △ | HC MOUNTAIN, ○ | HC MOUNTAIN, ○ | HC MOUNTAIN, ○ | HC MOUNTAIN, ○ |
| | 50 | HC MOUNTAIN, △ | HC MOUNTAIN, △ | HC MOUNTAIN, ○ | HC MOUNTAIN, ○ | HC MOUNTAIN, ○ | HC MOUNTAIN, ○ | HC MOUNTAIN, ○ |
| | 51 | HC MOUNTAIN, △ | HC MOUNTAIN, ○ | HC MOUNTAIN, ○ | HC MOUNTAIN, ○ | HC MOUNTAIN, ○ | HC MOUNTAIN, ○ | HC MOUNTAIN, ○ |
| | 56 | HC MOUNTAIN, ○ | HC MOUNTAIN, ○ | HC MOUNTAIN, ○ | HC MOUNTAIN, ○ | HC MOUNTAIN, ○ | HC MOUNTAIN, ○ | HC MOUNTAIN, ○ |
| | 60 | ST △ | HC MOUNTAIN, ○ | HC MOUNTAIN, ○ | HC MOUNTAIN, ○ | HC MOUNTAIN, ○ | HC MOUNTAIN, ○ | ST △ |
| | 68 | ST △ | ST ○ | ST ○ | HC MOUNTAIN, ○ | ST △ | ST △ | ST △ |
| | 69 | ST △ | ST VALLEY, ○ | ST VALLEY, ○ | ST ○ | ST ○ | ST ○ | ST △ |
| | 79 | ST ○ | ST VALLEY, ○ | ST VALLEY, ○ | ST ○ | ST ○ | ST ○ | ST △ |
| | 81 | ST ○ | ST VALLEY, ○ | ST VALLEY, ○ | ST ○ | ST ○ | ST ○ | ST △ |
| | 82 | ST ○ | ST VALLEY, ○ | ST VALLEY, ○ | ST ○ | ST ○ | ST ○ | ST △ |
| | 88 | ST ○ | ST VALLEY, ○ | ST VALLEY, ○ | ST ○ | ST ○ | ST ○ | ST ○ |
| | 90 | ST ○ | ST VALLEY, ○ | ST VALLEY, ○ | ST ○ | ST VALLEY, ○ | ST ○ | ST △ |

LASER BEAM MACHINING METHOD, LASER BEAM MACHINING APPARATUS, AND LASER BEAM MACHINING PRODUCT

TECHNICAL FIELD

The present invention relates to a laser beam machining method, laser beam machining apparatus, and a laser beam machined product.

BACKGROUND ART

The following Non-Patent Document 1 discloses a method for cutting a machining target by laser beam machining. The laser beam machining method described in the Non-Patent Document 1 aims to cut silicon wafers, and it uses light having a wavelength of about 1 µm which can transmit through silicon. The light is converged to the inside of the wafer to continuously form a modifying layer, and the wafer is cut with formation of the modifying layer as a trigger.

[Non-Patent Document 1] "LASER LIGHT DICING MACHINING IN SEMICONDUCTOR WAFER" authored by Kazunao Arai, Journal of The Society of Grinding Engineers, Vol. 47, No. 5, 2003 May. pp. 229-231.

DISCLOSURE OF THE INVENTION

When the silicon wafer machined by the laser beam machining method described above is cut, it is required to apply force to the wafer in a wafer bending direction which develops inner cracks. Accordingly, a yielding percentage would be lowered if a method for detaching tape adhering to the back side of the silicon wafer in parallel to the silicon wafer to cut the silicon wafer (expand method) is adopted.

Therefore, the present invention has an object to provide a laser beam machining method and a laser beam machining apparatus which can easily cut a machining target, and to provide a laser beam machined product which is cut easily.

Means for Solving the Problem

A laser beam machining method according to the present invention comprises a step of irradiating laser light to a machining target while converging the light to the inside of the machining target to form a treated area based on multiphoton absorption in the machining target along a planned cutting line of the machining target and also form a minute cavity at a predetermined position in connection with the treated area in the machining target.

According to the laser beam machining method of the present invention, the minute cavity is formed in connection with the treated area, and thus the pair of the treated area and the minute cavity can be formed in the machining target.

In the laser beam machining method of the present invention, preferably, further comprising a step of setting the planned cutting line. Because of comprising a step of setting the planned cutting line, the treated area and the minute cavity can be formed along the planned cutting line.

A laser beam machining method according to the present invention comprises a step in which setting a planned cutting line of a machining target; and a step in which irradiating laser light to the machining target while converging the light to the inside of the machining target, thereby forming a treated area based on multiphoton absorption in the machining target along the planned cutting line and form a minute cavity at a predetermined position in connection with the treated area in the machining target.

According to the laser beam machining method of the present invention, the minute cavity is formed in connection with the treated area, and thus the pair of the treated area and the minute cavity can be formed in the machining target.

In the laser beam machining method of the present invention, preferably, wherein the machining target is a semiconductor substrate, and the treated area is a molten processed area. Because of irradiating laser light to the semiconductor substrate, the melting area and the minute cavity can be formed.

In the laser beam machining method of the present invention, preferably, wherein the machining target is a semiconductor substrate, and the laser light is a pulse laser light which pulse width is set to 500 nsec or less. Because of irradiating pulse laser light which pulse width is set to 500 nsec or less, the minute cavity can be formed more accurately.

In the laser beam machining method of the present invention, preferably, wherein the machining target is a semiconductor substrate, and the laser light is a pulse laser light which pulse pitch is set to 1.00 µm to 7.00 µm. Because of irradiating pulse laser light which pulse pitch is set to 1.00 µm to 7.00 µm, the minute cavity can be formed more accurately.

In the laser beam machining method of the present invention, preferably, wherein the minute cavities are formed along the planned cutting line, each of the minute cavities are separated. Because of separating the minute cavities, the minute cavity can be formed more efficiently.

In the laser beam machining method of the present invention, preferably, wherein the minute cavities are formed along the planned cutting line, each of the minute cavities are separated. Because of separating the minute cavities, the minute cavity can be formed more efficiently.

In the laser beam machining method of the present invention, preferably, wherein a functional element is formed on a principle surface of the machining target, and the minute cavity is located between the principle surface and the treated area. Because of forming the minute cavity on the side of the principle surface, dividing precision of the functional element side is improved.

In the laser beam machining method of the present invention, preferably, the minute cavity is formed the other side of the laser light incidence, putting the treated area between them.

In the laser beam machining method of the present invention, preferably, further comprising a step of cutting the machining target which is formed the minute cavity.

A laser beam machining method according to the present invention comprises a step in which setting a planned cutting line of a semiconductor substrate; and a step in which irradiating laser light to the semiconductor substrate while converging the light to the inside of the semiconductor substrate, thereby forming a molten processed area in the semiconductor substrate along the planned cutting line and form a minute cavity at a predetermined position in connection with the molten processed area in the semiconductor substrate.

According to the laser beam machining method of the present invention, the minute cavity is formed in connection with the molten processed area, and thus the pair of the molten processed area and the minute cavity can be formed in the semiconductor substrate.

A laser beam machining method according to the present invention comprises a step in which setting a planned cutting line of a semiconductor substrate; and a step in which irradiating laser light to the semiconductor substrate while converging the light to the inside of the semiconductor substrate, thereby forming a molten processed area in the semiconductor substrate along the planned cutting line and form a minute cavity at a predetermined position in connection with the molten processed area in the semiconductor substrate, and the laser light is a pulse laser light which pulse width is set to 500 nsec or less.

According to the laser beam machining method of the present invention, irradiating pulse laser light which pulse width is set to 500 nsec or less, the minute cavity can be formed more accurately.

A laser beam machining method according to the present invention comprises a step in which setting a planned cutting line of a semiconductor substrate; and a step in which irradiating laser light to the semiconductor substrate while converging the light to the inside of the semiconductor substrate, thereby forming a molten processed area in the semiconductor substrate along the planned cutting line and form a minute cavity at a predetermined position in connection with the molten processed area in the semiconductor substrate, and the laser light is a pulse laser light which pulse pitch is set to 1.00 μm to 7.00 μm.

According to the laser beam machining method of the present invention, irradiating pulse laser light which pulse pitch is set to 1.00 μm to 7.00 μm, the minute cavity can be formed more accurately.

In the laser beam machining method of the present invention, preferably, wherein the minute cavities are formed along the planned cutting line, each of the minute cavities are separated. Because of separating the minute cavities, the minute cavity can be formed more efficiently.

In the laser beam machining method of the present invention, preferably, wherein a functional element is formed on a principle surface of the semiconductor substrate, and the minute cavity is located between the principle surface and the molten processed area. Because of forming the minute cavity on the side of the principle surface, dividing precision of the functional element side is improved.

In the laser beam machining method of the present invention, preferably, the minute cavity is formed the other side of the laser light incidence, putting the molten processed area between them.

In the laser beam machining method of the present invention, preferably, comprising a step of cutting the machining target which is formed the minute cavity.

A laser beam machining apparatus according to the present invention comprises laser light source, a mount table for mounting a machining target, and a controller for controlling relative position of the laser light source and the mount table, wherein the controller control relative position of the laser light source and the mount table while converging the laser light to the inside of the machining target, and the controller move the laser light source and the mount table relatively along a planned cutting line, thereby forming a treated area based on multiphoton absorption in the machining target along the planned cutting line and form a minute cavity at a predetermined position in connection with the treated area in the machining target.

According to the laser beam machining apparatus of the present invention, the minute cavity is formed in connection with the treated area, and thus the pair of the treated area and the minute cavity can be formed in the machining target.

A laser beam machining apparatus according to the present invention comprises laser light source, a mount table for mounting a semiconductor substrate, and a controller for controlling relative position of the laser light source and the mount table, wherein the controller control relative position of the laser light source and the mount table while converging the laser light to the inside of the semiconductor substrate, and the controller move the laser light source and the mount table relatively along a planned cutting line, thereby forming a molten processed area in the semiconductor substrate along the planned cutting line and form a minute cavity at a predetermined position in connection with the molten processed area in the semiconductor substrate.

According to the laser beam machining apparatus of the present invention, the minute cavity is formed in connection with the molten processed area, and thus the pair of the molten processed area and the minute cavity can be formed in the semiconductor substrate.

A laser beam machining apparatus according to the present invention comprises laser light source, a mount table for mounting a semiconductor substrate, and a controller for controlling relative position of the laser light source and the mount table, wherein the controller control relative position of the laser light source and the mount table while converging the laser light to the inside of the semiconductor substrate, and the controller move the laser light source and the mount table relatively along a planned cutting line, thereby forming a molten processed area in the semiconductor substrate along the planned cutting line and form a minute cavity at a predetermined position in connection with the molten processed area in the semiconductor substrate, and the laser light is a pulse laser light which pulse width is set to 500 nsec or less.

According to the laser beam machining apparatus of the present invention, irradiating pulse laser light which pulse width is set to 500 nsec or less, the minute cavity can be formed more accurately.

A laser beam machining apparatus according to the present invention comprises laser light source, a mount table for mounting a semiconductor substrate, and a controller for controlling relative position of the laser light source and the mount table, wherein the controller control relative position of the laser light source and the mount table while converging the laser light to the inside of the semiconductor substrate, and the controller move the laser light source and the mount table relatively along a planned cutting line, thereby forming a molten processed area in the semiconductor substrate along the planned cutting line and form a minute cavity at a predetermined position in connection with the molten processed area in the semiconductor substrate, and the laser light is a pulse laser light which pulse pitch is set to 1.00 μm to 7.00 μm.

According to the laser beam machining apparatus of the present invention, irradiating pulse laser light which pulse pitch is set to 1.00 μm to 7.00 μm, the minute cavity can be formed more accurately.

In the laser beam machining apparatus of the present invention, preferably, wherein the minute cavities are formed along the planned cutting line, each of the minute cavities are separated. Because of separating the minute cavities, the minute cavity can be formed more efficiently.

A laser beam machined product of the present invention is achieved by cutting a machining target by laser beam machining, and a treated area which is modified with multiphoton absorption is formed at a portion along a principal face formed by the cutting, and a minute cavity having an opening portion is formed at a predetermined position which is located on the principal face formed by the cutting and corresponds to the treated area.

The laser beam machined product of the present invention is formed by forming the treated area and the minute cavity in connection with each other in the machining target to obtain a laser beam machined object, and cutting the laser beam machined object at a portion where the treated area and the minute cavity are formed.

In the laser beam machined product of the present invention, preferably, wherein the machining target is a semiconductor substrate, and the treated area is a molten processed area. Because of irradiating laser light to the semiconductor substrate, the melting area and the minute cavity can be formed.

In the laser beam machined product of the present invention, preferably, wherein the minute cavities are formed along the planned cutting line, each of the minute cavities are separated. Because of separating the minute cavities, the minute cavity can be formed more efficiently.

In the laser beam machined product of the present invention, preferably, wherein an interval of the minute cavities is 1.00 μm to 7.00 μm. Because of separating the minute cavities, the minute cavity can be formed more efficiently.

In the laser beam machined product of the present invention, preferably, wherein the treated area is formed in a first zone along the planned cutting line, and the minute cavities are formed in a second zone separated from the first zone. Both of the treated area and the minute cavity are formed in the first zone and the second zone, the treated area and the minute cavity are formed in a group each other.

A laser beam machining method according to the present invention comprises a step of: irradiating laser light to a machining target while converging the light to the inside of the machining target, thereby forming a treated region which includes a treated area in the machining target along a planned cutting line of the machining target and form a minute cavity region which includes a minute cavity along at least one part of the planned cutting line.

According to the laser beam machining method of the present invention, to form the treated region and the minute cavity region along at least one part of the planned cutting line, it is easy to cut the machining target.

In the laser beam machining method of the present invention, preferably, the machining target is a semiconductor substrate, and the treated area is a molten processed area.

A laser beam machined product of the present invention is achieved by cutting a machining target by laser beam machining, a treated region which includes a treated area which is formed at a portion along a principal face formed by the cutting; and a minute cavity region which includes a minute cavity having an opening portion formed at a predetermined position which is located on the principal face formed by cutting.

In the laser beam machining product of the present invention, preferably, the machining target is a semiconductor substrate, and the treated area is a molten processed area.

When the treated area and the minute cavity are formed in the laser beam machined target according to the laser beam machining method of the present invention, the machining target can be easily cut.

BRIEF DESCRIPTION OF THE DRAWINGS

FIG. 12 A diagram showing a condition of the laser beam machining method of the embodiment.

Figure 1:
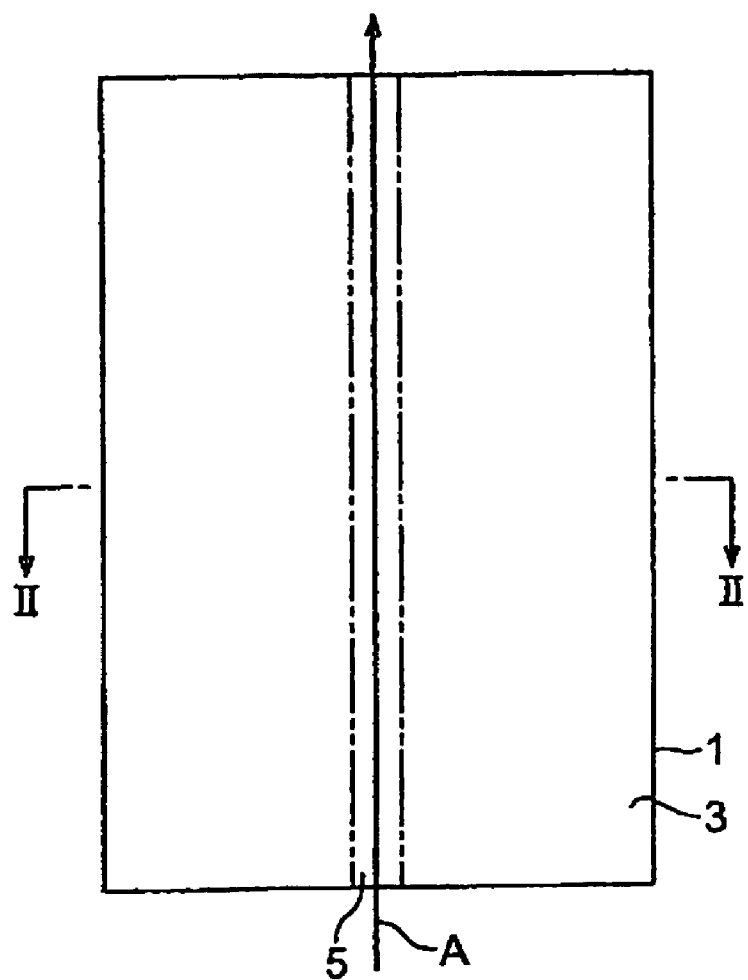
FIG. 1 A plan view showing a machining target to be subjected to laser beam machining according to a laser beam machining method of an embodiment.

1: machining target, 3: surface, 5: planned cutting line, 7: treated area, 8: minute cavity

BEST MODES FOR CARRYING OUT THE INVENTION

The knowledge of the present invention can be easily understood by considering the following detailed description with reference to the accompanying drawings illustrated for only exemplification. Subsequently, an embodiment according to the present invention will be described with reference to the accompanying drawings. If possible, the same constituent elements are represented by the same reference numerals, and overlapping description thereof is omitted.

The laser beam machining method of this embodiment will be described. According to the laser beam machining method of this embodiment, a treated area (molten processed area) is formed by multiphoton absorption, and also a minute cavity whose periphery is not substantially varied in crystal structure is formed at a predetermined position corresponding to the treated area. The multiphoton absorption is a phenomenon occurring when the intensity of laser light is strong. First, the multiphoton absorption will be briefly described.

When the energy hv of photons is smaller than the band gap $E_G$ of absorption of a material, the material is optically transparent. Accordingly, a condition under which the material absorbs light is $hv > E_G$. However, even when the material is optically transparent, the material absorbs light under a condition of $nhv > E_G$ (n=2, 3, 4, . . . ) if the intensity of the laser light is increased. This phenomenon is called multiphoton absorption. In the case of a pulse wave, the intensity of laser light is determined by the peak power density of the focusing point (W/cm$^2$), and multiphoton absorption occurs under a condition where the peak power density is equal to 1×108 (W/cm$^2$) or more. The peak power density is determined by dividing (the energy per one pulse of laser light at a focusing point) by (the beam spot sectional area of the laser light×pulse width). In the case of a continuous wave, the intensity of laser light is determined by the electric field intensity (W/cm$^2$) of the laser light at a focusing point.

The laser beam machining method of this embodiment using the multiphoton absorption as described above will be described with reference to FIG. 1 to FIG. 6. FIG. 1 is a plan view showing a machining target 1 (semiconductor substrate) in a laser beam machining process, FIG. 2 is a cross-sectional view of the machining target 1 shown in FIG. 1, which is taken along a II-II line, FIG. 3 is a plan view showing the machining target 1 after the laser beam machining process, FIG. 4 is a cross-sectional view of the machining target 1 shown in FIG. 3, which is taken along a IV-IV line, FIG. 5 is a cross-sectional view of the machining target 1 shown in FIG. 3, which is taken along a V-V line, and FIG. 6 is a plan view of the machining target 1 which is cut.

Figure 2:
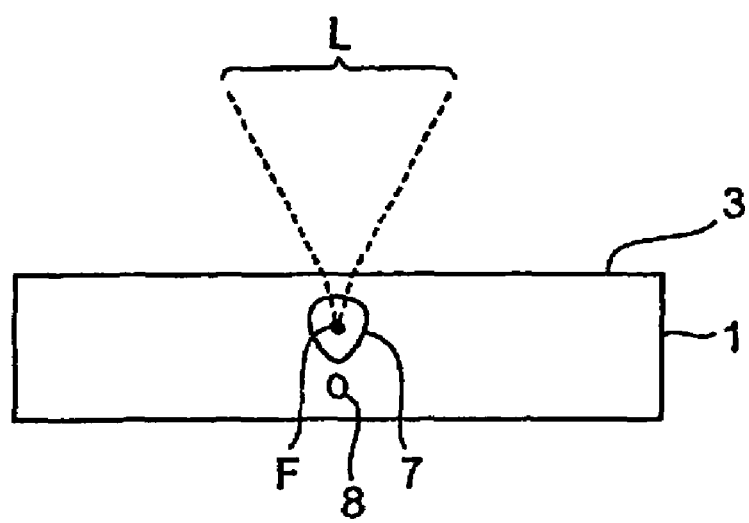
FIG. 2 A cross-sectional view of the machining target shown in FIG. 1 which is taken along II-II.

As shown in FIG. 1 and FIG. 2, a planned cutting line 5 is drawn on the surface 3 of the machining target 1. The planned cutting line 5 is a linearly-extending virtual line. The laser beam machining method according to this embodiment matches a focus point F to the inside of the machining target 1 under a condition where multiphoton occurs, and irradiates laser light L to the machining target 1 to form a treated area 7. The focusing point means a portion to which the laser light L is focused.

Figure 3:
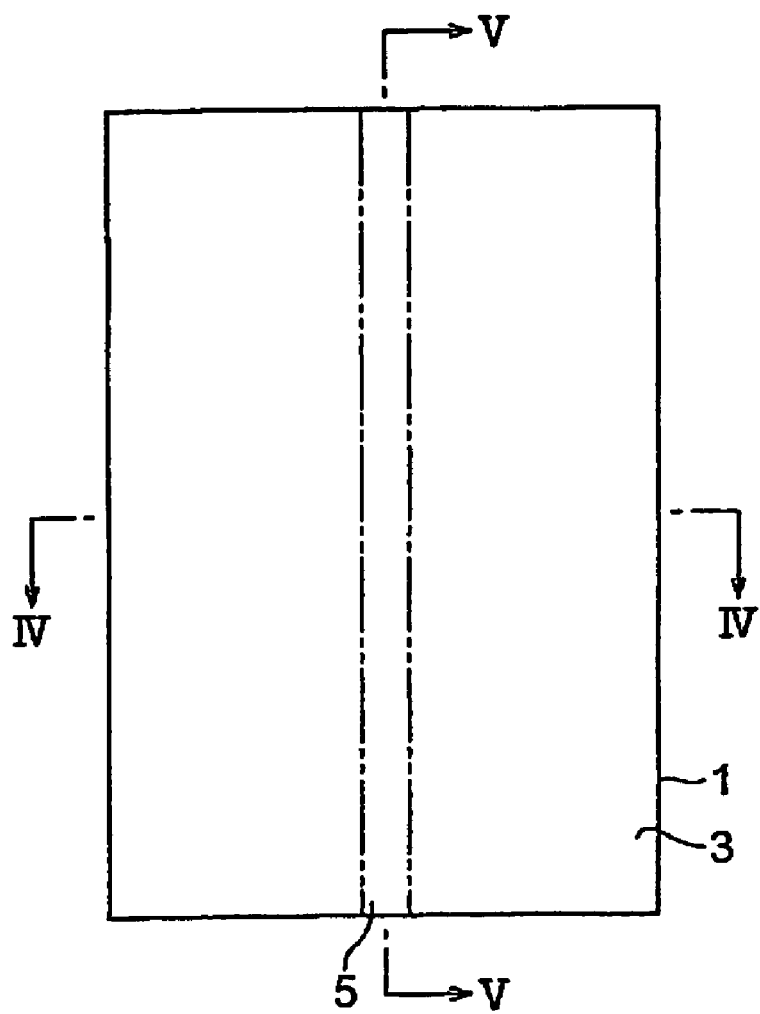
FIG. 3 A plan view of the machining target which has been subjected to laser beam machining according to the laser beam machining method of the embodiment.
Figure 4:
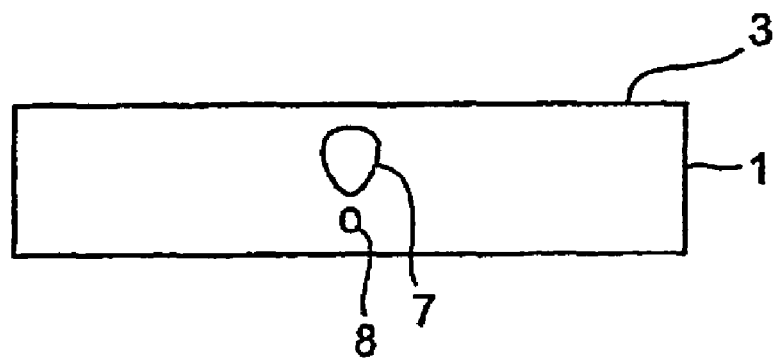
FIG. 4 A cross-sectional view of the machining target shown in FIG. 3 which is taken along IV-IV.
Figure 5:
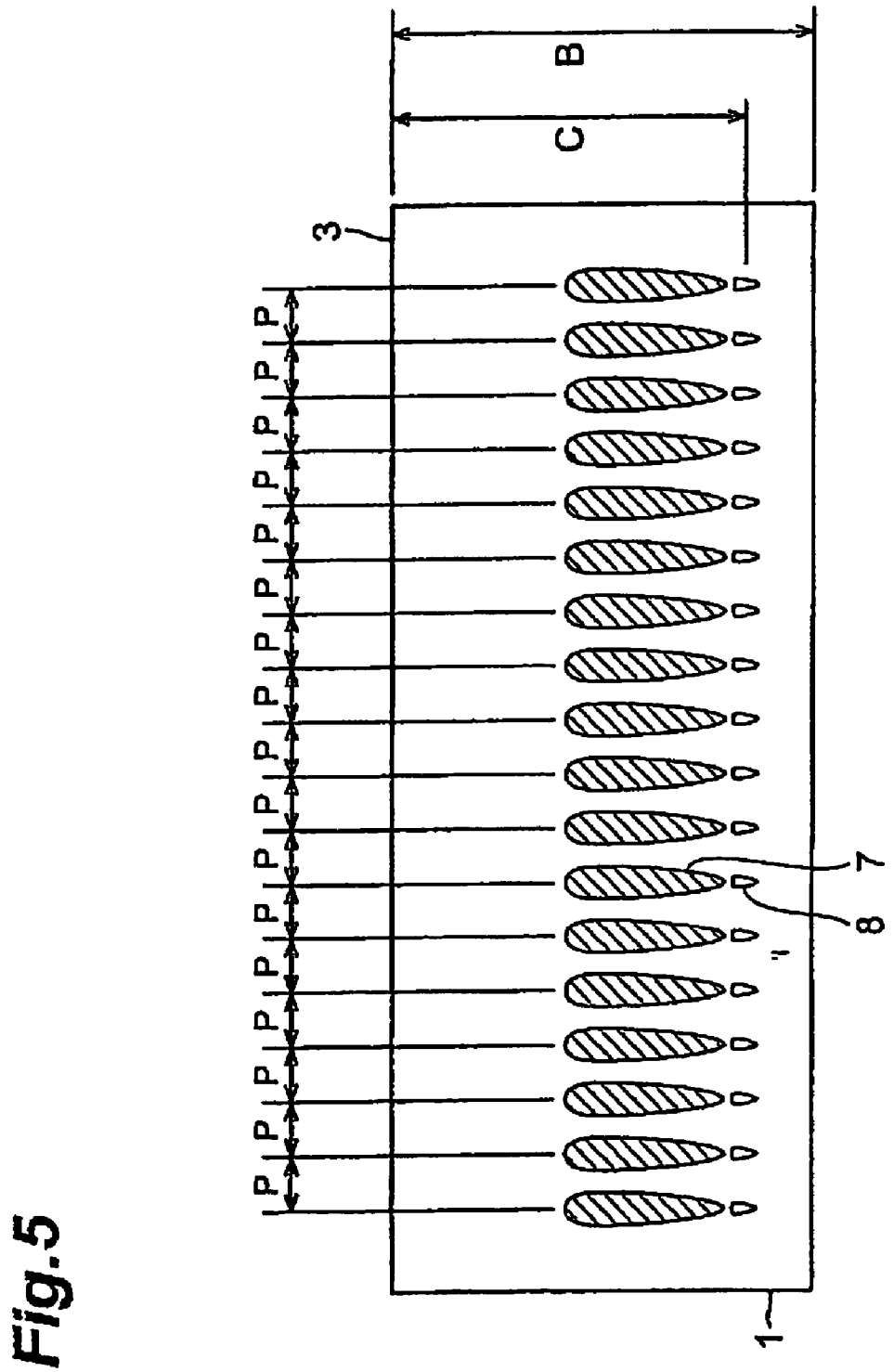
FIG. 5 A cross-sectional view of the machining target shown in FIG. 3 which is taken along V-V.

The laser light L is relatively moved along the planned cutting line 5 (that is, along a direction of an arrow A) at a predetermined pitch P to thereby move the focus point F along the planned cutting line 5, whereby a modified area comprising a treated area 7 and a minute cavity is formed along the planned cutting line 5 only inside the machining target 1 as shown in FIG. 3 to FIG. 5. The treated area 7 and the minute cavity 8 are formed at the predetermined pitch P at which the laser light L is moved as shown in FIG. 5. This pitch P is equal to pulse pitch of laser light L. The minute cavity 8 is formed at machining depth C, in thickness B of the machining target 1. As shown in FIG. 5, the minute cavity 8 is formed at the opposite side to the treated area 7 when viewing in the irradiation direction of the laser light L. The treated area 7 and the minute cavity 8 may be formed continuously with each other even when the treated area 7 and the minute cavity 8 are spaced from each other at a predetermined interval. According to the laser beam machining method of this embodiment, the treated area 7 is formed not by making the machining target 1 absorb the laser light L to heat the machining target 1, but by transmitting the laser light L through the machining target 1 to induce multiphoton absorption inside the machining target 1. Accordingly, the laser light L is hardly absorbed on the surface 3 of the machining target 1, and thus the surface 3 of the machining target 1 is not melted.

Figure 6:
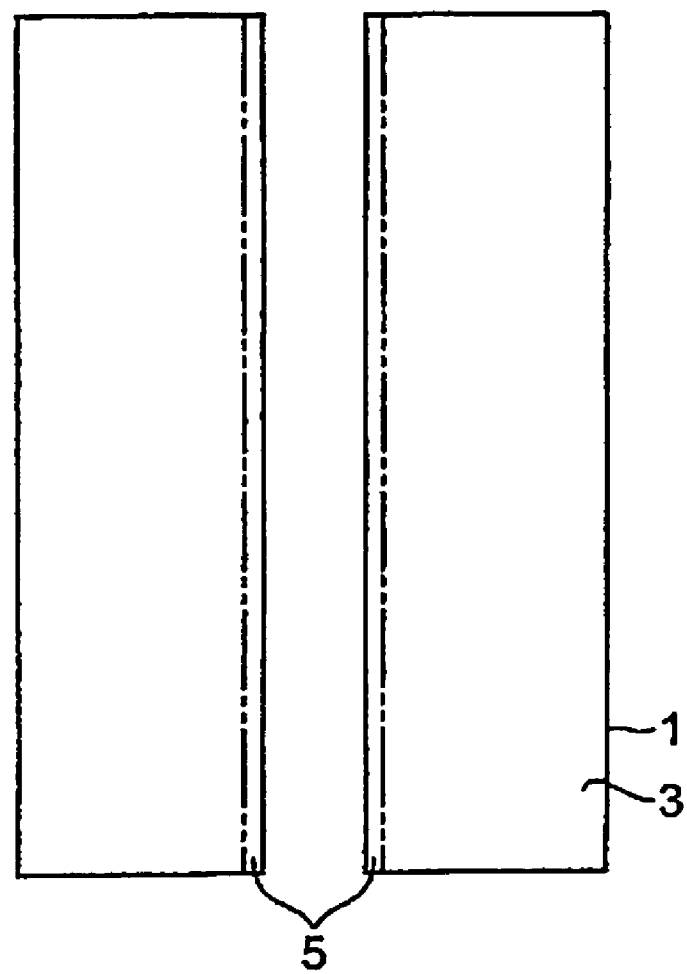
FIG. 6 A plan view showing the machining target which is cut according to the laser beam machining method of the embodiment.

In the cutting process of the machining target 1, the machining target 1 can be cut by forming the treated area 7 and the minute cavity 8 in the machining target 1 to obtain a laser beam machined object as described above, attaching tape on the back side of the machining target 1 and then detaching the tape in a direction perpendicular to the planned cutting line 5 of the machining target 1 (see FIG. 6). When a portion to be cut has a cut starting point, the machining target 1 is broken from the cut starting point, and thus the machining target 1 can be cut with relatively small force as shown in FIG. 6. Accordingly, the machining target 1 can be cut without generating any unnecessary cracks (namely, cracks which run off the planned cutting line) on the surface 3 of the machining target 1.

A molten processed area is known as one of the treated areas formed by multiphoton absorption in this embodiment. In this case, the laser light is converged to the inside of the machining target (for example, a semiconductor material such as silicon wafer or the like), and irradiated under the condition where electric field intensity at the focusing point is equal to 1×108 (W/cm$^2$) or more and the pulse width is equal to 1 μs or less, whereby the inside of the machining target is locally heated by multiphoton absorption. A molten processed area is formed inside the machining target by the heat.

The molten processed area means at least one of an area which has been once melted and then re-solidified, an area under a melting state and an area which was melted and is now being re-solidified. Furthermore, the molten processed area may be called a phase-varied area or a crystal-structure varied area. Still further, the molten processed area may be called an area in which one of a monocrystal structure, an amorphous structure and a polycrystal structure is varied with another structure.

That is, the molten processed area means an area varied from the monocrystal structure to the monocrystal structure, an area varied from the monocrystal structure to the polycrystal structure or an area varied from the monocrystal structure to a structure containing the amorphous structure and the polycrystal structure. When a machining target has a silicon monocrystal structure, the molten processed area means an amorphous silicon structure, for example. The upper limit value of the electric field intensity is equal to $1 \times 10^{12}$ (W/cm$^2$), for example. The pulse width is preferably set to 1ns to 200 ns, for example.

On the other hand, the minute cavity formed in this embodiment means an area around which the crystal structure is not substantially varied. When a machining target has a silicon monocrystal structure, the peripheral portion of the minute cavity frequently retains the silicon monocrystal structure.

Figure 7:
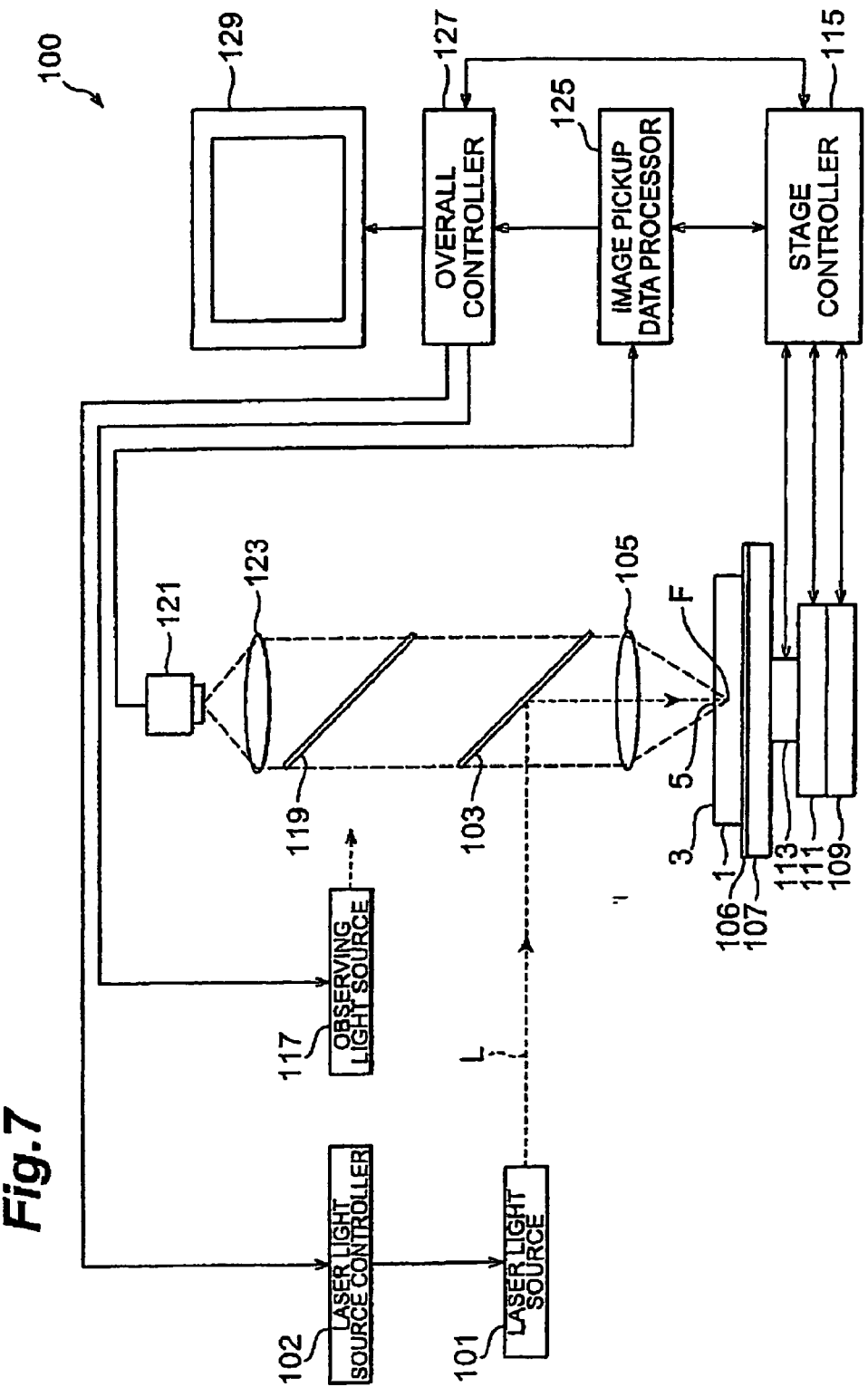
FIG. 7 A diagram showing a laser beam machining apparatus applicable to the laser beam machining method of the embodiment.

Next, a specific example of the laser beam machining method according to this embodiment will be described. FIG. 7 shows a laser beam machining apparatus 100 using the laser beam machining method according to this embodiment of the present invention.

The laser beam machining apparatus 100 shown in FIG. 7 is equipped with laser light source 101 for generating laser light L, laser light source controller 102 for controlling the laser light source 101 for adjusting the output, pulse width, etc., of the laser light L, a dichroic mirror 103 which has a function of reflecting the laser light and is disposed so that the direction of the optical axis of the laser light L is varied by 90 degrees, a condenser lens 105 for converging the laser light L reflected from the dichroic mirror 103, a mount table 107 for mounting thereon the machining target 1 to which the laser light L converged by the condenser lens 105 is irradiated, an X-axis stage 109 (controller) for moving the mount table 107 in the X-axis direction, a Y-axis stage 111 (controller) for moving the mount table 107 in a Y-axis direction perpendicular to the X-axis direction, a Z-axis stage 113 (controller) for moving the mount table 107 in a Z-axis direction perpendicular to the X-axis and y-axis directions, and a stage controller 115 (controller) for controlling the movement of the three stages 109, 111 and 113. Additionally, not shown, is an optical system for expanding the Gaussian distribution of the laser light disposed between the laser light source 101 and the condenser lens 105. In this embodiment, the machining target 1 is a silicon wafer, and thus expand tape 106 is attached to the back side of the machining target 1.

Since the Z-axis direction is perpendicular to the surface 3 of the machining target 1, it corresponds to the focal depth direction of the laser light L made incident to the machining target 1. Accordingly, the focus point F of the laser light L can be positioned at the inside of the machining target 1 by moving the Z-axis stage 113 in the Z-axis direction. The movement of the focus point F in the X(Y)-axis direction is carried out by moving the machining target 1 in the X(Y) axis direction with the X(Y)-axis stage 109 (111). The X(Y)-axis stage 109 (111) is an example of moving means.

The laser light source 101 is an Nd:YAG laser for emitting a pulse laser light. An Nd:YVO$_4$ laser, an Nd:YLF laser or a titan sapphire laser may be also used as the laser light source 101. When the treated area is a molten processed portion, the Nd:YAG laser, the Nd:YVO$_4$ laser or the Nd:YLF laser is preferably used. When the modified area is a refractive-index varied area, the titan sapphire laser is preferably used.

In this embodiment, pulse laser light is used to machine the machining target 1, however, continuous wave laser light may be used insofar as it can induce multiphoton absorption. In the present invention, the term of the laser light is broadly defined to contain a laser beam. The condenser lens 105 is an example of light converging means. The Z-axis stage 113 is an example of means for positioning the focus point of the laser light at the inside of the machining target. The focus point of the laser light may be also positioned at the inside of the machining target by moving the condenser lens 105 in the Z-axis direction.

The laser beam machining apparatus 100 is further equipped with an observing light source 117 for generating visible light to irradiate visible light to the machining target 1 mounted on the mount table 107, and a visible-light beam splitter 119 disposed on the same optical axis as the dichroic mirror 103 and the condenser lens 105. The dichroic mirror 103 is disposed between the beam splitter 119 and the condenser lens 105. The beam splitter 119 has a function of reflecting about a half of visible light and transmitting therethrough the other half of the visible light, and is disposed to vary the direction of the optical axis of the visible light by 90 degrees. About a half of the visible light generated from the observing light source 117 is reflected by the beam splitter 119, and the visible light thus reflected is transmitted through the dichroic mirror 103 and the condenser lens 105, and then irradiated to the surface 3 containing the planned cutting line 5, etc., of the machining target 1.

The laser beam machining apparatus 100 is further equipped with a beam splitter 119, and an image pickup element 121 and an imaging lens 123 which are disposed on the same optical axis as the dichroic mirror 103 and the condenser lens 105. A CCD (charge-coupled device) camera is known as the image pickup element 121. Reflection light of visible light irradiated to the surface 3 containing the planned cutting line 5, etc., is transmitted through the condenser lens 105, the diachronic mirror 103 and the beam splitter 119, imaged on the imaging lens 123 and then picked up by the image pickup element 121 to obtain image pickup data.

The laser beam machining apparatus 100 is further equipped with an image pickup data processor 125 to which the image pickup data output from the image pickup element 121 are input, an overall controller 127 for controlling the whole of the laser beam machining apparatus 100, and a monitor 129. The image pickup data processor 125 calculates focus point data to which the focus point of visible light generated by the observing light source 117 is positioned on the basis of the image pickup data. The stage controller 115 controls the movement of the Z-axis stage 113 on the basis of the focus point data so that the focus point of the visible light is positioned at the surface 3. Accordingly, the image pickup data processor 125 calculates as an auto focus unit. The image pickup data processor 125 calculates image data such as an enlarged image of the surface 3 or the like on the basis of the image pickup data. The image data are transmitted to the overall controller 127 to be subjected to various kinds of processing in the overall controller, and then transmitted to a monitor 129, whereby an enlarged image or the like is displayed on the monitor 129.

The overall controller 127 is supplied with data from the stage controller 115, image data from the image pickup data processor 125, etc., to control the laser light source controller 102, the observing light source 117 and the stage controller 115 on the basis of these data, thereby controlling the whole of the laser beam machining apparatus 100. Therefore, the overall controller 127 functions as a computer unit.

Figure 8:
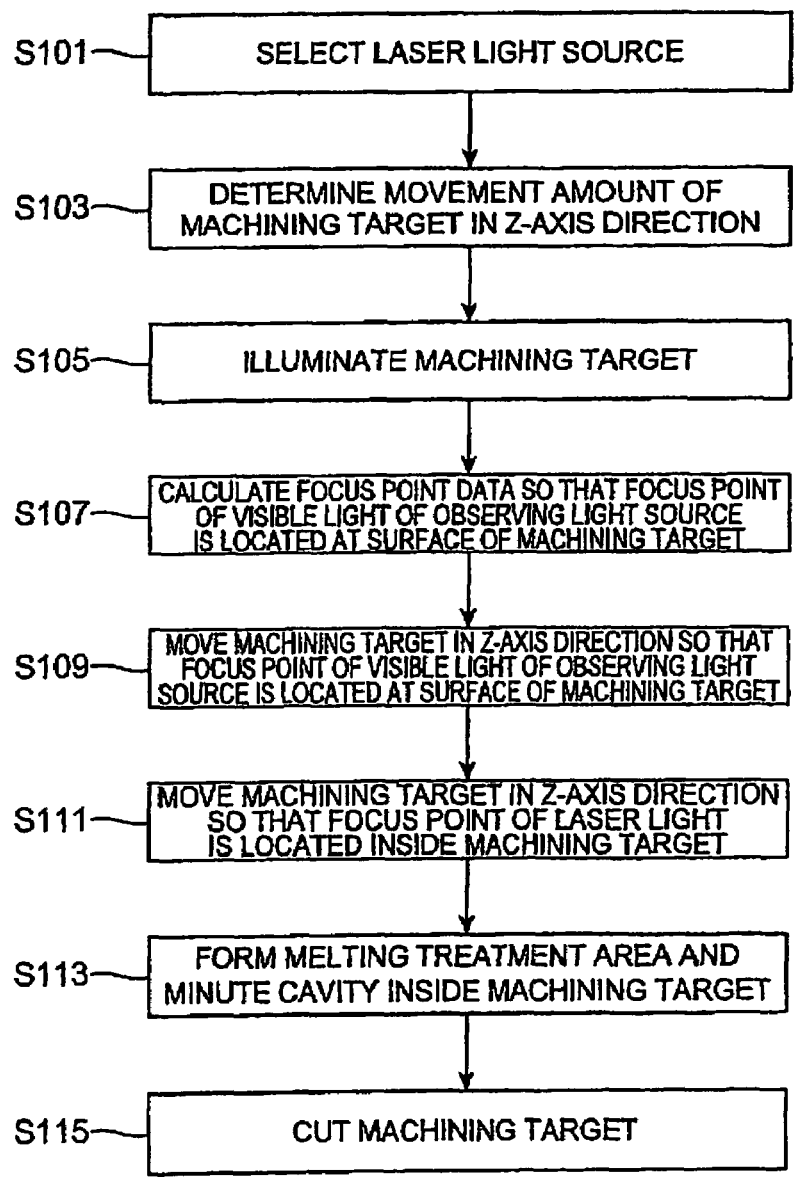
FIG. 8 A flowchart showing the laser beam machining method of the embodiment.

Next, the laser beam machining method according to this embodiment will be specifically described with reference to FIG. 7 and FIG. 8. FIG. 8 is a flowchart showing the laser beam machining method. The machining target 1 is a silicon wafer.

First, the optical absorption characteristic of the machining target 1 is measured by a spectrophotometer (not shown). A laser light source 101 for generating laser light L having a wavelength which is transparent to the machining target 1 or is slightly absorbed by the machining target 1 is selected on the basis of this measurement result (S101). Subsequently, the thickness of the machining target 1 is measured. A movement amount of the machining target 1 in the Z-axis direction is determined on the basis of the measurement result of the thickness and the refractive index of the machining target 1 (S103). This movement amount corresponds to a movement amount of the machining target 1 in the z-axis direction with respect to the focus point of the laser light L located at the surface 3 of the machining target 1 in order to position the focus point F of the laser light L at the inside of the machining target 1. This movement amount is input to the overall controller 127.

The machining target 1 is mounted on the mount table 107 of the laser beam machining apparatus 100, and then visible light is emitted from the observing light source 117 to irradiate the visible light to the machining target 1 (S105). An image of the surface 3 of the machining target 1 containing the planned cutting line 5 thus irradiated is picked up by the image pickup element 121. The image pickup data thus obtained are transmitted to the image pickup data processor 125. The image pickup data processor 125 calculates focus data on the basis of the image pickup data so that the focus point of the visible light of the observing light source 117 is located at the surface 3 (S107).

The focus data thus achieved are transmitted to the stage controller 115. The stage controller 115 moves the Z-axis stage 113 in the Z-axis direction on the basis of the focus data (S109), whereby the focus point of the visible light of the observing light source 117 is located at the surface 3. The image pickup data processor 125 calculates enlarged image data of the surface 3 of the machining target 1 containing the planned cutting line 5 on the basis of the image pickup data. The enlarged image pickup data are transmitted to the monitor 129 through the overall controller 127, whereby an enlarged image around the planned cutting line 5 is displayed on the monitor 129.

Movement amount data determined in step S103 are input to the overall controller 127 in advance, and the movement amount data thus input are transmitted to the stage controller 115. On the basis of the movement amount data, the stage controller 115 moves the machining target 1 in the Z-axis direction with the Z-axis stage 113 so that the focus point F of the laser light L is located at the inside of the machining target 1 (S111).

Subsequently, the planned cutting line 5 is set on the surface 3 of the machining target 1. Setting the planned cutting line 5 is setting laser scan position for cutting desirable place. It is also preferable for setting the planned cutting line 5, one way is using positioning-information of predetermined dicing-street by a planning data, and another way is watching the surface, or measuring the surface information. Namely, setting the planned cutting line 5 is controlling the laser machining apparatus for irradiating the laser beam to desirable position at the machining target. Subsequently, the laser light L is emitted from the laser light source 101, and then irradiated to the planned cutting line 5 on the surface 3 of the machining target 1. The focus point F of the laser beam L is located inside the machining target 1, and a molten processed area as a modified area is formed only inside the machining target 1. The X-axis stage 109 or the Y-axis stage 111 is moved at an initial pitch P along the planned cutting line 5 to form molten processed areas at the predetermined pitch P along the planned cutting line 5 in the machining target 1. When the molten processed areas are formed as described above, minute cavities are formed in connection with the respective molten processed areas (S113). The expand tape 106 attached to the back side of the machining target 1 is expanded in the peripheral edge direction of the wafer to separate the machining target 1 into parts along the planned cutting line 5, thereby cutting the machining target 1 (S115). Accordingly, the machining target 1 is divided into silicon chips (machined product).

Furthermore, in the silicon wafer as semiconductor substrate, the fractures are caused to occur in the cross-sectional direction with the planned cutting parts formed by the treated region including the molten processed regions (forming along the planned cutting line) and the minute cavity as starting points, and these fractures reach the surface and rear face of the silicon wafer so that the silicon wafer is cut as a result. In same cases, these fractures that reach the surface and rear face of the silicon wafer grow naturally; in other cases, the fractures are caused to grow by the application of a force to the silicon wafer. Furthermore, in cases where the fractures grow naturally to the surface and rear face of the silicon wafer from the planned cutting part, there may be cases in which the fractures grow from a state in which the molten processed regions in the treated region that form the planned cutting parts are in a molten condition, cases in which the fractures grow when the molten processed regions that form the planned cutting parts re-solidify from a molten state, and cases in which the fractures grow by strain causing stress distribution in the cut surface around the molten processed region and the minute cavity. In any cases, the molten processed regions or the minute cavities are formed only in the interior of the silicon wafer, so that in the cut surfaces following cutting, molten processed regions are formed only in the interior. When planned cutting parts are formed by molten processed regions and the minute cavitise in the interior of the semiconductor substrate, unnecessary fractures that deviate from the planned cutting part lines do not occur at the time of fracturing; accordingly, fracture control is easy. Moreover, by forming the minute cavities, stress distribution is occur around the molten processed regions and the minute cavities, it is easy to cut silicon wafer.

Figure 9:
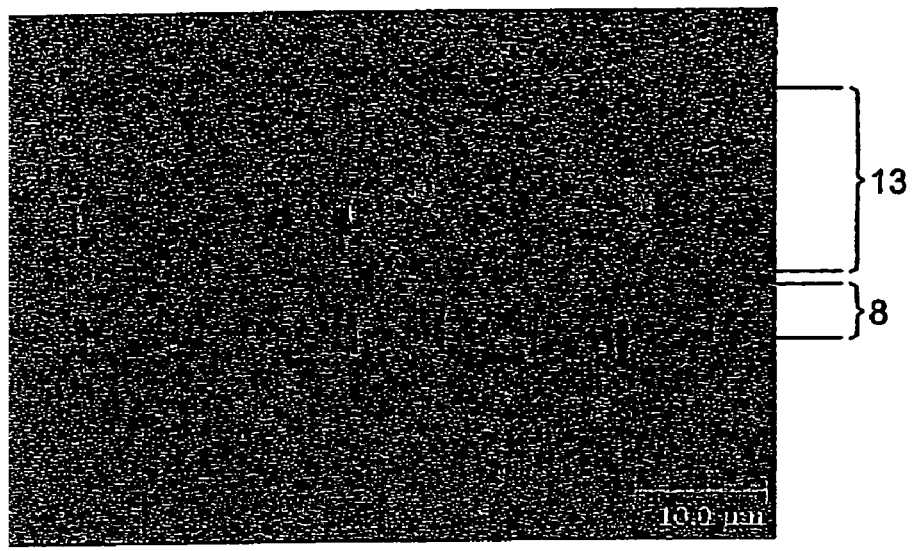
FIG. 9 A photograph of a section of a silicon wafer cut by the laser beam machining method of the embodiment.
Figure 10:
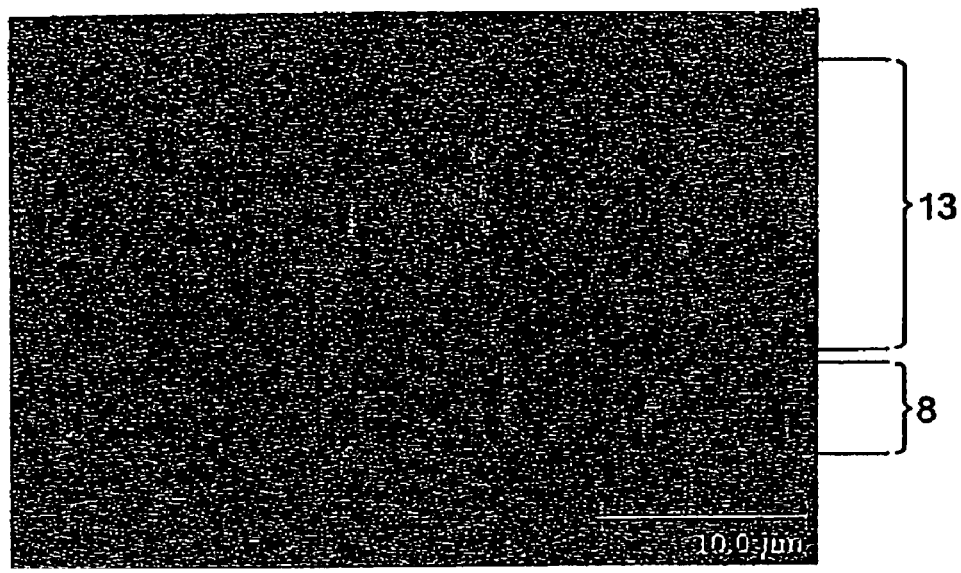
FIG. 10 A photograph of a section of a silicon wafer cut by the laser beam machining method of the embodiment.
Figure 11:
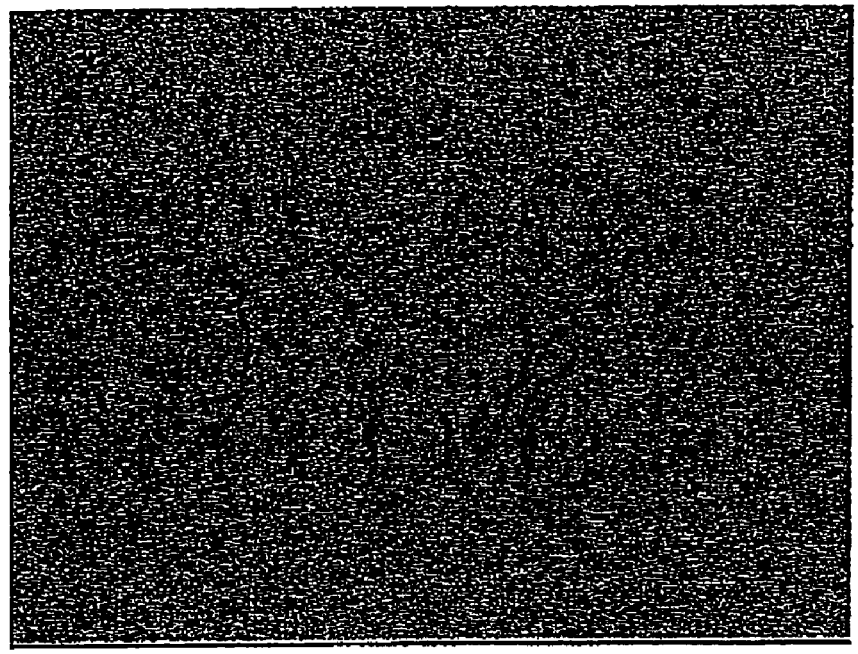
FIG. 11 A photograph of a whole section shown in FIG. 9 and FIG. 10.

FIG. 9 and FIG. 10 are photographs of the cross section of the silicon wafer which is cut according to the laser beam machining method described above. The photographs of FIG. 9 and FIG. 10 show the same cross section of the silicon wafer in different scales. The detailed condition when the cross section shown in FIG. 9 and FIG. 11 is formed is as follows.

(A) Workpiece: silicon wafer (thickness: 100 μm)
(B) Laser
    Light source: semiconductor laser excitation Nd:YAG laser
    Wavelength: 1064 nm
    Beam diameter: 3.99 mm
    Spread angle: 2.3 mrad
    Repetitive frequency: 40 kHz
    Pulse width: 200 nsec
    Pulse pitch: 7 μm
    Machining depth: 13 μm
    Pulse energy: 20 μJ/pulse
(C) Condenser lens
    NA: 0.8
(D) Moving speed of mount table on which machining target is mounted: 280 mm/sec In the molten processed area (treated area) 13 of the cross section shown in FIG. 9 and FIG. 10, the width in the thickness direction of the silicon wafer (in the vertical direction in FIG. 9 and FIG. 10) is equal to about 13 μm, and the width of the laser moving direction (in the horizontal direction in FIG. 9 and FIG. 10) is equal to about 3 μm. In the minute cavity 8, the width in the thickness direction of the silicon wafer (in the vertical direction in FIG. 9 and FIG. 10) is equal to about 7 μm, and the width in the laser moving direction (in the horizontal direction in FIG. 9 and FIG. 10) is equal to about 1.3 μm. The interval between the molten processed area 13 and the minute cavity 8 is equal to about 1.2 μm. FIG. 11 is a photograph of a whole section shown in FIG. 9 and FIG. 10.

Subsequently, Raman analysis results of the cross section shown in FIG. 9 and FIG. 10 will be described. A measuring device and a measuring method will be described below.

(1) Apparatus: Ramanor U-1000 (Jobin Yvon) (II)
(2) Measurement mode: Micro-probe microscope (Olympus BH-2 type)
    Beam splitter: Irradiating system, R=25%
    Light converging system, R=100%
    Objective lens: ×90 (long focus point)
(3) Light source: Ar+laser 457.9 nm
(4) Polarized light: incident light P, scattered light S+P
(5) Spectroscope: U-1000 (Diffraction Grating: Plane Holographic 1800 gr/mm)
(6) Detector: CCD Jobin Yvon The Raman analysis is carried out on a measurement position 1 in the vicinity of the molten processed area 13, a measurement position 2 in the vicinity of the minute cavity 8, a measurement position 3 between the molten processed area 13 and the minute cavity 8, and a measurement position 4 at the upper side of the molten processed area 13.

(Estimation of Amorphous Si)

No Raman ray originated from amorphous Si was clearly observed from any position. This means that no amorphous Si existed or an existence amount of amorphous Si was not more than the detection limit.

(Estimation of Crystallinity)

The spectra at the measurement positions 2, 3 and 4 had the same degree of half maximum full-width. Furthermore, as compared with reference Si (110), they had the same degree as the reference Si. Therefore, it is considered that monocrystal Si having high crystallinity might exist at all of the measurement positions 2, 3 and 4. On the other hand, a broad Raman ray was observed at the measurement position 1, and thus it is considered that polycrystal Si might exist at the measurement position 1.

(Estimation of Stress)

It is considered that an extremely great compression stress might occur at the measurement position 1. Furthermore, it is considered that compression stress might occur at the measurement position 3, and also it is considered that slight stress which corresponds to the detection lower limit might occur at the measurement positions 2 and 4.

Here, an estimation result of cut-off performance when modified areas were formed at a 5 mm pitch in horizontal and vertical directions to an orientation flat in a silicon wafer of 6 inches in size and 100 μm in thickness were employed and then expander separation was conducted while varying the pulse pitch and the machining depth so that the silicon wafer was divided into plural chips of 5 mm×5 mm will be described with reference to FIG. 12.

This estimation was obtained by estimating the surface state and the cut-off performance when the pulse pitch was fixed and the machining depth (the depth in which the minute cavity is formed) was varied from 45 μm to 90 μm in a wafer of 100 μm in thickness. In FIG. 12, "HC, mountain" means "half cut, tinge of mountain," and it indicates that cracks or the like appear on a surface of the silicon wafer at the laser incident side. "ST, valley" means "stealth, tinge of valley," and it indicates that cracks or the like appear on the opposite surface to the laser incident side. "ST" means "stealth," and it indicates that cracks or the like are not observed at any surface. A "circle" indicates that the silicon wafer can be cut into all parts when the tape attached to the back side of the silicon wafer is expanded to carry out expander separation, and a triangle indicates that the silicon wafer cannot be cut into all the parts.

It is apparent from FIG. 12 that the preferable pulse pitch is around 4.00 μm. It is preferable that the machining depth (the depth in which the minute cavity is formed) is large. It is preferable that the pulse pitch is not very much increased. Estimating these totally, the pulse pitch is preferably set to 1.00 μm to 7.00 μm, and more preferably 3.00 μm to 5.00 μm. Furthermore, the machining depth (the depth in which the minute cavity is formed) is preferably set to 45 μm to 90 μm in wafer of 100 μm, and more preferably to 65 μm to 85 μm.

For example, when the silicon wafer has a large thickness of 300 μm, it is preferable to repetitively carry out the laser beam machining process described above while varying the machining depth, and a combination of a molten processed area and a minute cavity is formed at least one stage.

Figure 13:
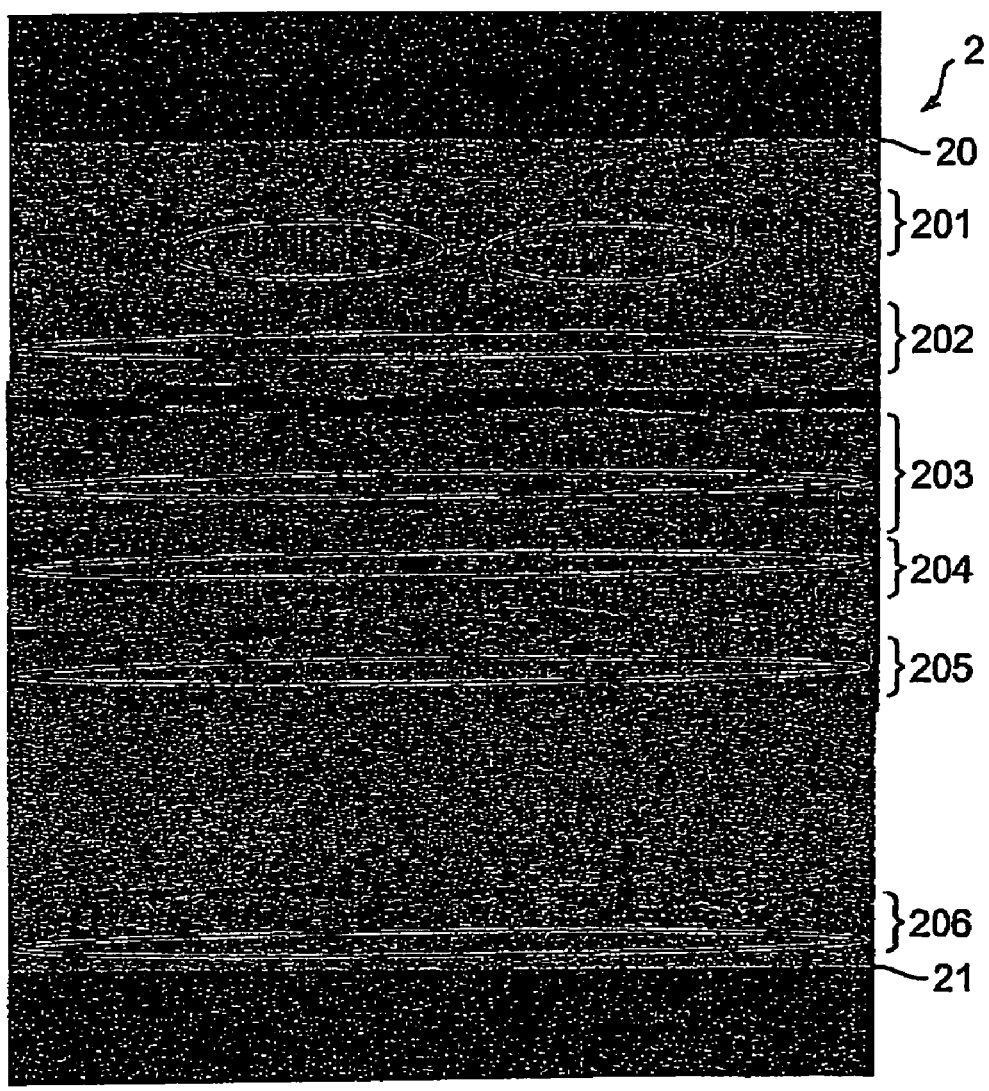
FIG. 13 A photograph of a section of a silicon wafer cut by the laser beam machining method of the embodiment.
Figure 14:
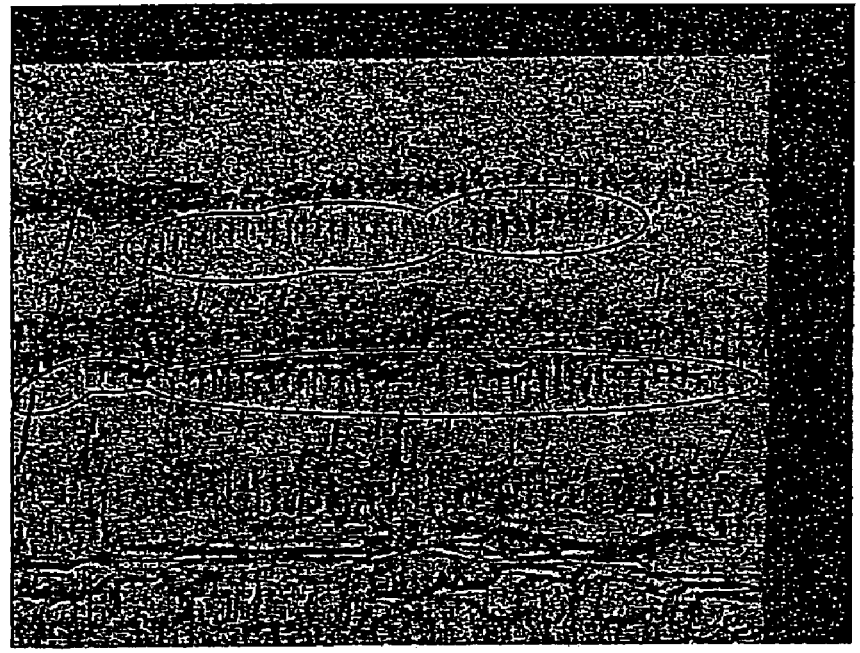
FIG. 14 A photograph of a section of a silicon wafer cut by the laser beam machining method of the embodiment.

FIG. 13 and FIG. 14 are photographs of the cross section of the thick silicon wafer which is cut according to the laser beam machining method described above. The photograph of FIG. 13 is the thick silicon wafer 2 which is machined from the surface 21 to the surface 22. As a result, the modified areas 201 to 206 are formed. In the modified area 203, a minute cavity is not visible; because of doing laser beam machining method multiply. In the modified area 201, 202, 203, 204, the minute cavities are visible. Forming the minute cavities, stress distribution is occurring around the molten processed area and the minute cavities, so that it is easy to cut. Moreover, the minute cavities are to starting point for cutting, when add power from outside. Then, it is necessary for cutting and separating the semiconductor substrate as expand a tape that fixed it, that a condition for easily cut. Forming the minute cavities is the condition. It is especially effective for cutting semiconductor substrate that forming the molten processed area and the minute cavities.

Figure 15:
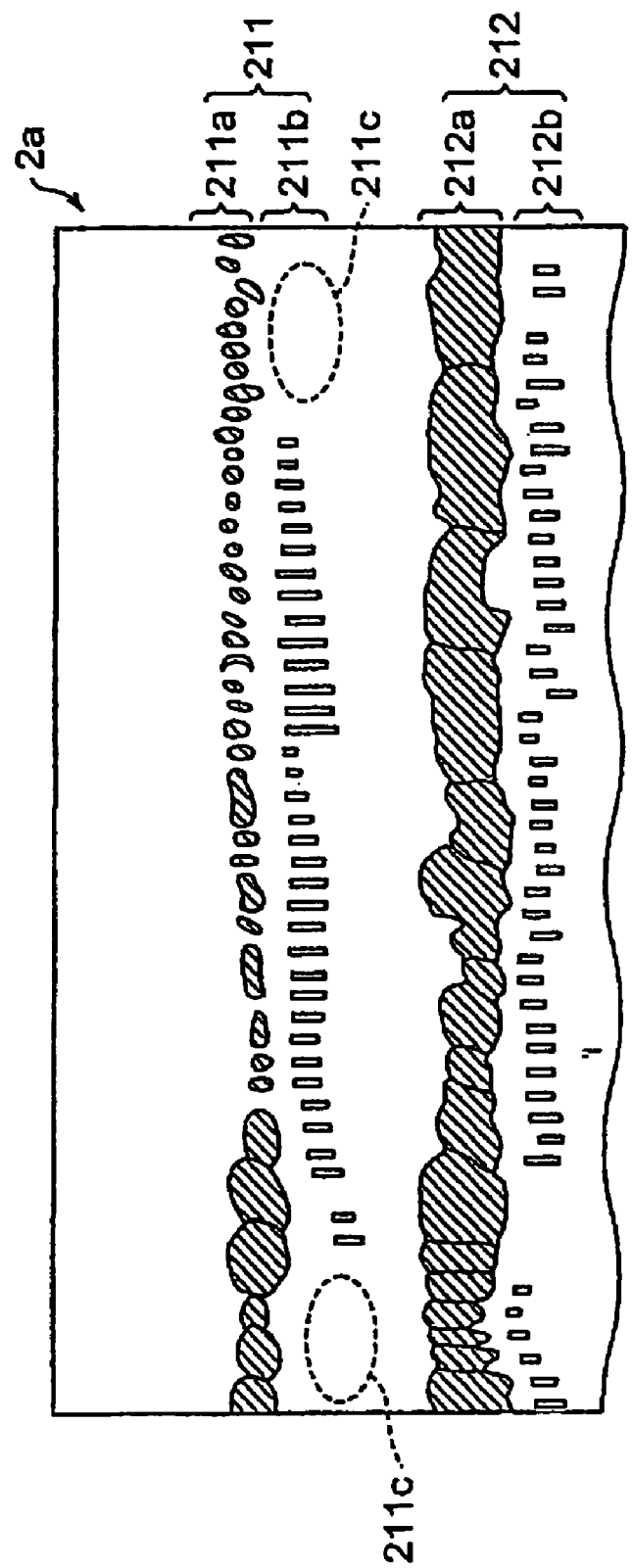
FIG. 15 A rough sketch of the photograph shown in FIG. 14.

The photograph of FIG. 14 is the thick silicon wafer 2a which is machined same method of FIG. 13. The rough sketch of FIG. 14 is shown in FIG. 15. In the thick silicon wafer 2a, a modified area 211 and 212 are formed. The modified area 211 has a melting treated area 211a, and a minute cavity 211b. The modified area 212 has a melting treated area 212a, and a minute cavity 212b. The minute cavities 212b are formed equally. On the other hand, the minute cavities 212b are not formed equally, so that there is an area 211c in which a minute cavity is not formed. A region where a minute cavity is difficult to forming is generate under condition of the surface. In this case, a melting treated area 211a is formed along the planned cutting line continuously; on the other hand a minute cavity 212b is formed here and there. Even in this case, it is easy for cutting that existence of the minute cavity. Starting points of cutting is formed along the planned cutting line, because of forming a melting treated area 211a almost continuously. Even if the minute cavity is not exist all along the planned cutting line, exist minute cavity 212b act for fracture growing. In a word, because of forming a treated region (a first zone) which includes a treated area in the machining target along a planned cutting line of the machining target and form a minute cavity region (a second zone) which includes a minute cavity along at least one part of the planned cutting line, they are working for the starting point, so that easy to cut the machining target. In the case of cutting a semiconductor substrate that is good cleavage character (e.g. GaAs), it is not necessary for forming the modified area (the treated area and the minute cavity) all along the planned cutting line. In this case, the modified area is preferably formed along one part of the planned cutting line. It is also prefer to form the modified area only a part which improving cutting precision.

Figure 18:
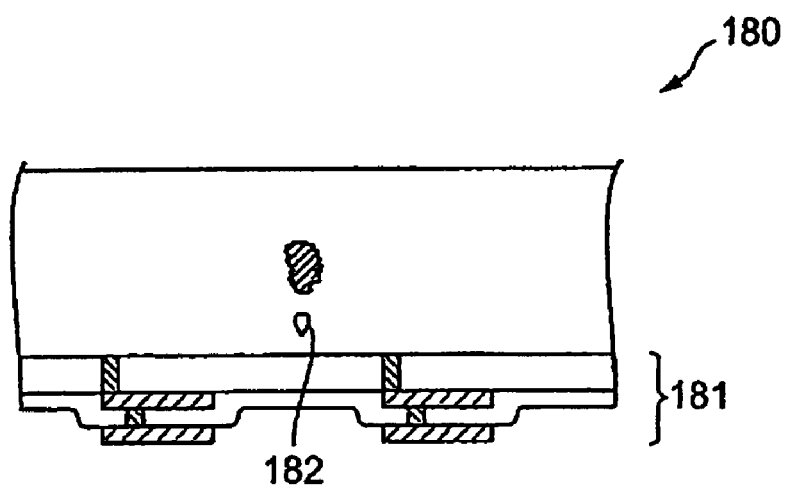
FIG. 18 A drawing of a section of a silicon wafer cut by the laser beam machining method of the embodiment.
Figure 19:
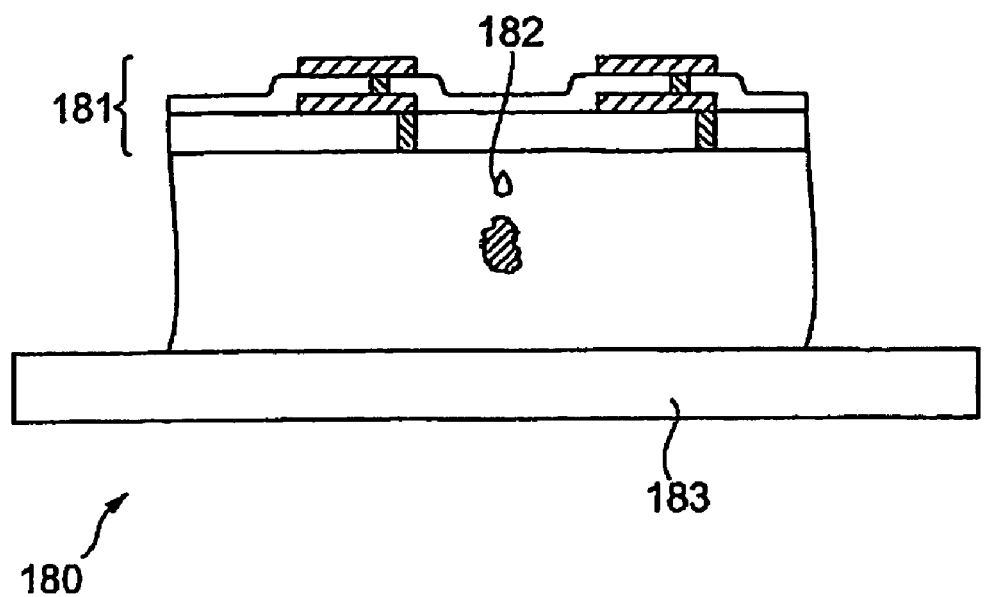
FIG. 19 A drawing of a section of a silicon wafer cut by the laser beam machining method of the embodiment.
Figure 20:
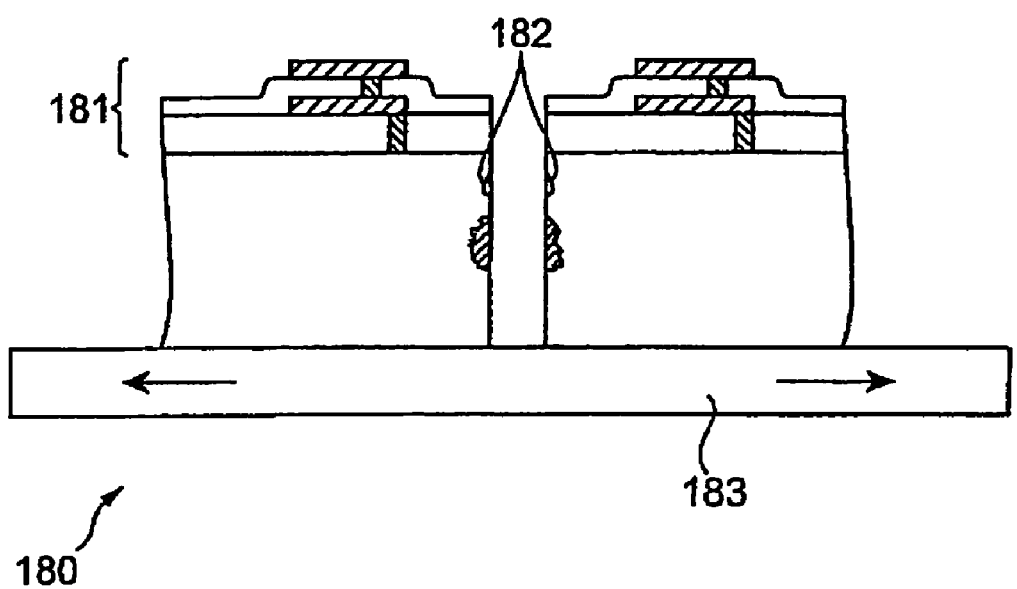
FIG. 20 A drawing of a section of a silicon wafer cut by the laser beam machining method of the embodiment.

When a pattern is formed on a surface of a silicon wafer, a laser beam is preferably made incident from a surface opposite to the pattern-formed surface. The broken section of the minute cavity side is apt to be smoother than the broken section of the molten processed area, and thus the yield of good products can be greatly enhanced when the minute cavities are formed at the pattern-formed surface. Concretely, as shown in FIG. 18, at a silicon wafer 180 which has a surface formed a functional element 181 (functional device), the minute cavity 182 is formed on the side of the surface, so that dividing precision of the functional element 181 side is improved. Accordingly it is able to improve a rate of quality item, and to improve production efficiency. For cutting a semiconductor substrate that is formed a modified area inside by expanding a tape fixed the semiconductor substrate, it is necessary easily cutting condition. The condition is satisfied existence of the minute cavity. It is effective modify for forming a molten processed area with the minute cavity, in case of cutting a semiconductor substrate. In case of cutting silicon wafer 180 shown in FIG. 18, fix the silicon wafer 180 on a tape 183. After that, expand the tape 183 for cutting the silicon wafer 180, shown in FIG. 20. Whether case of fixing the tape 183 to the silicon wafer 180 after forming a modified area or before forming a modified area, it is acceptable for cutting process.

It is preferable that the Gaussian distribution is spread with respect to the lens aperture to use a lens incident beam like a top hat (it is preferable to increase energy of a light beam having large NA). NA is preferably set in the range from 0.5 to 1.0.

The pulse width is preferably set to 500 nsec or less. More preferably, it is set in the range from 10 nsec to 500 nsec. More preferably, it is set in the range from 10 nsec to 300 nsec. Further more preferably, it is set in the range from 100 nsec to 200 nsec.

It is considered that the molten processed area and the minute cavity are paired and also the depth of each of them has a predetermined relation with the thickness of the silicon wafer. Particularly, the molten processed area and the minute cavity have a predetermined relation with each other in accordance with NA.

The cutting direction is preferably parallel to or vertical to the orientation flat (ori-fla). It is preferable to form molten processed areas along the crystal orientation.

In this embodiment, a semiconductor wafer made from silicon is used for the machining target; raw material is not necessarily silicon. For example, raw material is selected from compound semiconductor including IV group element compound except silicon or IV group element like as SiC, compound semiconductor including III-V group elements, compound semiconductor including II-VI group elements, and compound semiconductor doped various impurities.

Effects of the present invention will be described. According to the present invention, pulse laser light L is irradiated to the planned cutting line 5 under a condition where multiphoton absorption can be induced and while the focus point F is positioned at the inside of the machining target 1. The focus point F is moved at a predetermined pitch P along the planned cutting line 5 by moving the X-axis stage 109 and the Y-axis stage 111, whereby treated areas are formed along the planned cutting line 5 in the machining target 1, and also minute cavities are formed. Accordingly, the machining target 1 can be cut off without generating any unnecessary cracks out of the planned cutting line 5 in the surface 3 of the machining target 1.

Furthermore, pulse laser light L is irradiated to the planned cutting line 5 under a condition where multiphoton absorption is induced in the machining target 1 and while the focus point F is positioned at the inside of the machining target 1. Accordingly, the pulse laser light L is transmitted through the machining target 1, and the pulse laser light L is hardly absorbed at the surface 3 of the machining target 1, so that the surface 3 suffers no damage such as melting or the like due to formation of modified areas.

As described above, the machining target 1 can be cut off without generating neither occurrence of unnecessary cracks out of the planned cutting line 5 nor melting on the surface of the machining target 1. Accordingly, for example, when the machining target 1 is a semiconductor wafer, semiconductor chips can be taken out from the semiconductor wafer while neither unnecessary cracks out of the planned cutting line nor melting occurs. The same is satisfied in the case of a machining target on which an electrode pattern is formed, and a machining target on which an electrical device is formed, such as a piezoelectric element wafer or a glass substrate on which a display device such as liquid crystal or the like is formed. Accordingly, the yield of products (for example, a semiconductor chip, a piezoelectric device chip, a display device such as liquid crystal or the like) manufactured by cutting a machining target can be enhanced.

Furthermore, since the planned cutting line 5 on the surface 3 of the machining target 1 is not melted, the width of the planned cutting line 5 (in the case of a semiconductor wafer, this width corresponds to the interval between areas serving as semiconductor chips) can be reduced. Accordingly, the number of products which can be manufactured from one machining target 1 is increased, and thus the productivity of products can be enhanced.

According to the present invention, laser light is used for cutting work of a machining target 1, and thus more complicated machining can be performed than dicing using a diamond cutter.

In addition, there has not been necessarily provided a clear explanation to the principle that when laser light L is transmitted through a machining target 1 to induce multiphoton absorption in the machining target 1 and thus form treated areas 7, minute cavities 8 are formed in connection with the treated areas 7. With respect to the principle that each treated area 7 and each minute cavity 8 are formed while being paired with each other, the inventors of this application assume one hypothesis, and this hypothesis will be described hereunder.

Figure 16:
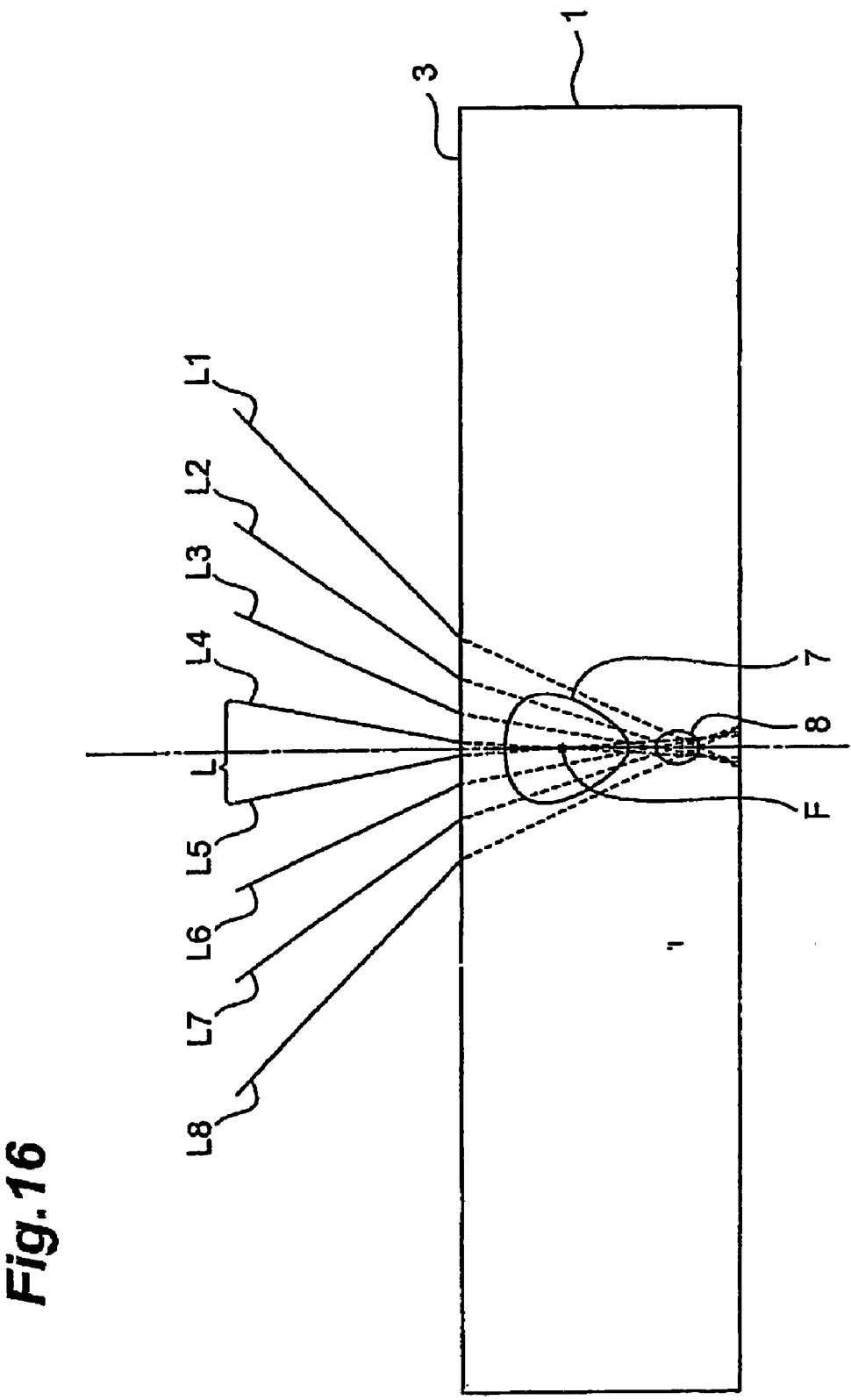
FIG. 16 A diagram showing the principle of the laser beam machining method of the embodiment.

FIG. 16 is a diagram showing this hypothesis. When laser light L is converged to a focusing point in a machining target 1 and irradiated to the machining target 1, a treated area 7 is formed in the vicinity of the focus point F. In the prior art, light at the center portion of laser light (light corresponding to L4 and L5 in FIG. 16) irradiated from a laser source is used as the laser light L. This is because the center portion of the Gaussian distribution of the laser light is used.

The inventors of this application expand laser light in order to suppress an effect of the laser light on the surface of the machining target. This is implemented by expanding laser light irradiated from a laser source through a predetermined optical system to expand the skirts of the Gaussian distribution and relatively increase the laser intensity of light (corresponding to L1 to L3 and L6 to L8 in FIG. 16) at the peripheral portion of the laser light.

When the laser light thus expanded is transmitted through the machining target 1, a treated area 7 is formed in the vicinity of the focus point F as described above, and a minute cavity 8 is formed at the portion corresponding to the treated area 7. That is, the treated area 7 and the minute cavity 8 are formed to be located along the optical axis of the laser light (indicated by a chain line in FIG. 16). The position at which the minute cavity 8 is formed corresponds to a portion on which the light of the peripheral portion of the laser light (i.e., the light corresponding to L1 to L3 and L6 to L8) is theoretically focused.

As described above, it is considered that a portion on which light at the center portion of the laser light (light at the portions corresponding to L4 and L5 in FIG. 16) is converged and a portion on which light at the peripheral portion of the laser light (light at the portions corresponding to L1 to L3 and L6 to L8 in FIG. 16) is converged are different in the thickness direction of the machining target 1 because of spherical aberration of a lens for converging the laser light. One hypothesis assumed by the inventors resides in that the difference in focus position as described above has some effect.

The hypothesis supported by the inventors is as follows. The focus portion for light at the peripheral portion of the laser light (corresponding to L1 to L3 and L6 to L8 in FIG. 16) is theoretically a laser focusing point, so that it is estimated that the intensity of the light at this portion is high. Accordingly, micro-structural variation occurs at the portion due to the high-intensity light, however, substantially no crystal structural variation occurs at the peripheral portion of this focus portion. Therefore, a minute cavity 8 is formed at the peripheral portion. On the other hand, a great thermal effect is applied at the portion where the treated area 7 is formed, and thus this portion is merely melted and then re-solidified.

Figure 17:
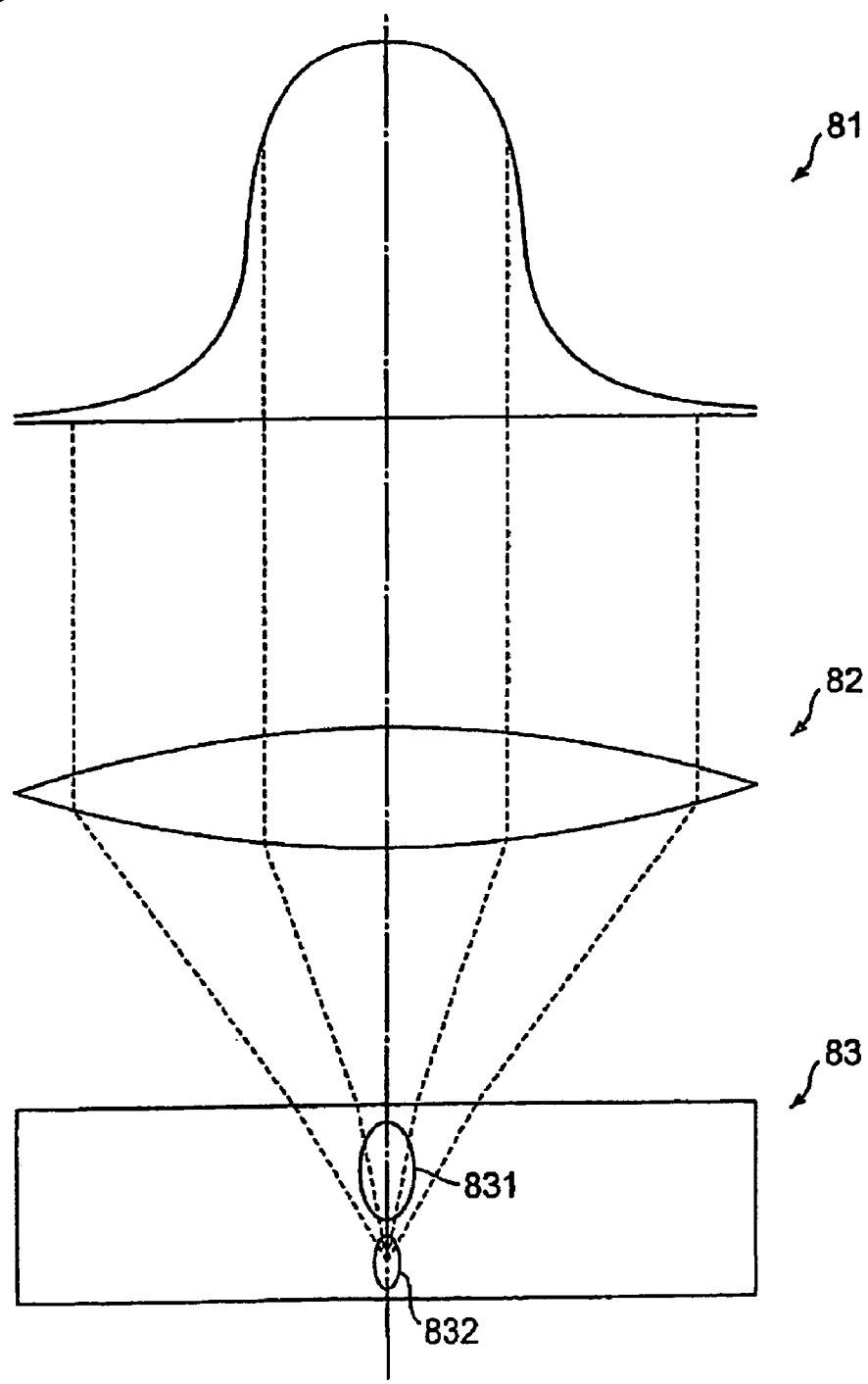
FIG. 17 A diagram showing the principle of the laser beam machining method of the embodiment.

FIG. 17 is a diagram showing the above hypothesis. When laser light having a Gaussian distribution 81 is emitted, it is transmitted through an optical system 82 and then irradiated to a machining target 83. As shown in FIG. 8, light at the peripheral portion of the laser light (indicated by broken lines of FIG. 17) is converged in the vicinity of a portion where a minute cavity 832 is formed. On the other hand, light at a relatively high-intensity portion of the laser light in the Gaussian distribution 81 is converged in the vicinity of a portion where a treated area 831 is formed.

The invention claimed is:

1. A laser beam machining method comprising:
irradiating laser light to a machining target while converging the light to the inside of the machining target, thereby forming a treated area based on multiphoton absorption in the machining target along a planned cutting line of the machining target and forming a minute cavity at a predetermined position in connection with the treated area in the machining target, wherein
the treated area is a molten processed area,
the laser light is a pulsed laser light,
a pair comprising the treated area and the minute cavity is formed by irradiating at least 1 pulse of the laser light, the laser light being relatively moved along the planned cutting line, thereby forming a plurality of pairs along the planned cutting line, and
each of the minute cavities are separated by a predetermined distance along the planned cutting line.

2. The laser beam machining method according to claim 1, further comprising setting the planned cutting line.

3. The laser beam machining method according to claim 1, wherein the machining target is a semiconductor substrate, and a pulse width is set to 500 nsec or less.

4. The laser beam machining method according to claim 1, wherein the machining target is a semiconductor substrate, and a pulse pitch is set to 1.00 μm to 7.00 μm.

5. The laser beam machining method according to claim 1, wherein a functional element is formed on a principle surface of the machining target, and the minute cavity is located between the principle surface and the treated area.

6. The laser beam machining method according to claim 1, wherein the treated area is between the minute cavity and a laser light incident face of the machining target.

7. The laser beam machining method according to claim 1, further comprising cutting the machining target which is formed with the minute cavity.

8. A laser beam machining method comprising:
setting a planned cutting line of a machining target; and
irradiating laser light to the machining target while converging the light to the inside of the machining target, thereby forming a treated area based on multiphoton absorption in the machining target along the planned cutting line and forming a minute cavity at a predetermined position in connection with the treated area in the machining target, wherein
the treated area is a molten processed area,
the laser light is a pulsed laser light,
a pair comprising the treated area and the minute cavity is formed by irradiating at least 1 pulse of the laser light, the laser light being relatively moved along the planned cutting line, thereby forming a plurality of pairs along the planned cutting line, and
each of the minute cavities are separated by a predetermined distance along the planned cutting line.

9. A laser beam machining method comprising:
setting a planned cutting line of a semiconductor substrate; and
irradiating laser light to the semiconductor substrate while converging the light to the inside of the semiconductor substrate, thereby forming a molten processed area in the semiconductor substrate along the planned cutting line and forming a minute cavity at a predetermined position in connection with the molten processed area in the semiconductor substrate, wherein
the laser light is a pulsed laser light,
a pair comprising the molten processed area and the minute cavity is formed by irradiating at least 1 pulse of the laser light, the laser light being relatively moved along the planned cutting line, thereby forming a plurality of pairs along the planned cutting line, and
each of the minute cavities are separated by a predetermined distance along the planned cutting line.

10. The laser beam machining method according to claim 9, wherein a functional element is formed on a principle surface of the semiconductor substrate, and the minute cavity is located between the principle surface and the molten processed area.

11. The laser beam machining method according to claim 9, wherein the molten processed area is between the minute cavity and a laser light incident face of the semiconductor substrate.

12. The laser beam machining method according to claim 9, further comprising cutting the machining target which is formed with the minute cavity.

13. A laser beam machining method comprising:
setting a planned cutting line of a semiconductor substrate; and
irradiating laser light to the semiconductor substrate while converging the light to the inside of the semiconductor substrate, thereby forming a molten processed area in the semiconductor substrate along the planned cutting line and forming a minute cavity at a predetermined position in connection with the molten processed area in the semiconductor substrate, the laser light being a pulse laser light in which a pulse width is set to 500 nsec or less, wherein
a pair comprising the molten processed area and the minute cavity is formed by irradiating at least 1 pulse of the laser light, the laser light being relatively moved along the planned cutting line, thereby forming a plurality of pairs along the planned cutting line, and
each of the minute cavities are separated by a predetermined distance along the planned cutting line.

14. A laser beam machining method comprising:
setting a planned cutting line of a semiconductor substrate; and
irradiating laser light to the semiconductor substrate while converging the light to the inside of the semiconductor substrate, thereby forming a molten processed area in the semiconductor substrate along the planned cutting line and forming a minute cavity at a predetermined position in connection with the molten processed area in the semiconductor substrate, and the laser light being a pulse laser light in which a pulse pitch is set to 1.00 μm to 7.00 μm, wherein
a pair comprising the molten processed area and the minute cavity is formed by irradiating at least 1 pulse of the laser light, the laser light being relatively moved along the planned cutting line, thereby forming a plurality of pairs along the planned cutting line, and
each of the minute cavities are separated by a predetermined distance along the planned cutting line.

15. A laser beam machining method comprising:
irradiating laser light to a machining target while converging the light to the inside of the machining target, thereby forming a treated region which includes a treated area in the machining target along a planned cutting line of the machining target and forming a minute cavity region which includes a minute cavity along at least one part of the planned cutting line, wherein
the treated area is a molten processed area,
the laser light is a pulsed laser light, a pair comprising the treated area and the minute cavity is formed by irradiating at least 1 pulse of the laser light, the laser light being relatively moved along the planned cutting line, thereby forming a plurality of pairs along the planned cutting line, and each of the minute cavities are separated by a predetermined distance along the planned cutting line.

16. A method of manufacturing a semiconductor device formed using a laser beam machining method, the manufacturing method comprising:

irradiating laser light to a machining target, the machining target comprising semiconductor material and having a surface formed with at least one semiconductor device, while converging the light to the inside of the machining target, thereby forming a treated area based on multiphoton absorption in the machining target along a planned cutting line of the machining target, and forming a minute cavity at a predetermined position in connection with the treated area in the machining target, to facilitate cutting of the machining target along the planned cutting line in order to provide at least one manufactured semiconductor device, wherein the treated area is a molten processed area, the laser light is a pulsed laser light, a pair comprising the treated area and the minute cavity is formed by irradiating at least 1 pulse of the laser light, the laser light being relatively moved along the planned cutting line, thereby forming a plurality of pairs along the planned cutting line, and each of the minute cavities are separated by a predetermined distance along the planned cutting line.

17. A method of manufacturing a semiconductor device formed using a laser beam machining method, the manufacturing method comprising:

setting a planned cutting line of a machining target, the machining target comprising semiconductor material and having a surface formed with at least one semiconductor device; and irradiating laser light to the machining target while converging the light to the inside of the machining target, thereby forming a treated area based on multiphoton absorption in the machining target along the planned cutting line, and forming a minute cavity at a predetermined position in connection with the treated area in the machining target, to facilitate cutting of the machining target along the planned cutting line in order to provide at least one manufactured semiconductor device, wherein the treated area is a molten processed area, the laser light is a pulsed laser light, a pair comprising the treated area and the minute cavity is formed by irradiating at least 1 pulse of the laser light, the laser light being relatively moved along the planned cutting line, thereby forming a plurality of pairs along the planned cutting line, and each of the minute cavities are separated by a predetermined distance along the planned cutting line.

18. A method of manufacturing a semiconductor device formed using a laser beam machining method, the manufacturing method comprising:

setting a planned cutting line of a semiconductor substrate, the semiconductor substrate having a surface formed with at least one semiconductor device; and irradiating laser light to the semiconductor substrate while converging the light to the inside of the semiconductor substrate, thereby forming a molten processed area in the semiconductor substrate along the planned cutting line, and forming a minute cavity at a predetermined position in connection with the molten processed area in the semiconductor substrate, to facilitate cutting of the semiconductor substrate along the planned cutting line in order to provide at least one manufactured semiconductor device, wherein the laser light is a pulsed laser light, a pair comprising the molten processed area and the minute cavity is formed by irradiating at least 1 pulse of the laser light, the laser light being relatively moved along the planned cutting line, thereby forming a plurality of pairs along the planned cutting line, and each of the minute cavities are separated by a predetermined distance along the planned cutting line.

19. A method of manufacturing a semiconductor device formed using a laser beam machining method, the manufacturing method comprising:

setting a planned cutting line of a semiconductor substrate, the semiconductor substrate having a surface formed with at least one semiconductor device; and irradiating laser light to the semiconductor substrate while converging the light to the inside of the semiconductor substrate, thereby forming a molten processed area in the semiconductor substrate along the planned cutting line, and forming a minute cavity at a predetermined position in connection with the molten processed area in the semiconductor substrate, wherein the laser light is a pulse laser light in which a pulse width is set to 500 nsec or less, to facilitate cutting of the semiconductor substrate along the planned cutting line in order to provide at least one manufactured semiconductor device, wherein a pair comprising the molten processed area and the minute cavity is formed by irradiating at least 1 pulse of the laser light, the laser light being relatively moved along the planned cutting line, thereby forming a plurality of pairs along the planned cutting line, and each of the minute cavities are separated by a predetermined distance along the planned cutting line.

20. A method of manufacturing a semiconductor device formed using a laser beam machining method, the manufacturing method comprising:

setting a planned cutting line of a semiconductor substrate, the semiconductor substrate having a surface formed with at least one semiconductor device, with laser light while locating a light-converging point within the object; and irradiating laser light to the semiconductor substrate while converging the light to the inside of the semiconductor substrate, thereby forming a molten processed area in the semiconductor substrate along the planned cutting line, and forming a minute cavity at a predetermined position in connection with the molten processed area in the semiconductor substrate, wherein the laser light is a pulse laser light in which a pulse pitch is set to 1.00 μm to 7.00 μm, to facilitate cutting of the semiconductor substrate along the planned cutting line in order to provide at least one manufactured semiconductor device, wherein a pair comprising the molten processed area and the minute cavity is formed by irradiating at least 1 pulse of the laser light, the laser light being relatively moved along the planned cutting line, thereby forming a plurality of pairs along the planned cutting line, and each of the minute cavities are separated by a predetermined distance along the planned cutting line.

21. A method of manufacturing a semiconductor device formed using a laser beam machining method, the manufacturing method comprising:

irradiating laser light to a machining target, the machining target comprising semiconductor material and having a surface formed with at least one semiconductor device, while converging the light to the inside of the machining target, thereby forming a treated region which includes a treated area in the machining target along a planned cutting line of the machining target, and forming a minute cavity region which includes a minute cavity along at least one part of the planned cutting line, to facilitate cutting of the machining target along the planned cutting line in order to provide at least one manufactured semiconductor, device wherein the treated area is a molten processed area, the laser light is a pulsed laser light, a pair comprising the treated area and the minute cavity is formed by irradiating at least 1 pulse of the laser light, the laser light being relatively moved along the planned cutting line, thereby forming a plurality of pairs along the planned cutting line, and each of the minute cavities are separated by a predetermined distance along the planned cutting line.

22. The method according to any one of claims 1, 8, 9-14, 15, and 16-21, wherein the molten processed area is at least one of an area which has been melted and then re-solidified, an area under a melting condition, and an area which was melted and is being re-solidified.

23. The method according to any one of claims 1, 8, 9-14, 15, and 16-21, wherein the molten processed area is a phase-varied area or a crystal-structure varied area.

24. The method according to any one of claims 1, 8, 9-14, 15, and 16-21, wherein the molten processed area is an area in which one of a monocrystal structure, an amorphous structure, and a polycrystal structure is varied with another structure.

25. A laser beam machining apparatus comprising:

a laser light source, a mount table for mounting a machining target, and a controller for controlling a relative position of the laser light source and the mount table, wherein the controller controls the relative position of the laser light source and the mount table while converging the laser light to the inside of the machining target, and the controller moves the laser light source and the mount table relatively along a planned cutting line, thereby forming a treated area based on multiphoton absorption in the machining target along the planned cutting line and forming a minute cavity at a predetermined position in connection with the treated area in the machining target, wherein the treated area is a molten processed area, the laser light is a pulsed laser light, a pair comprising the treated area and the minute cavity is formed by irradiating at least 1 pulse of the laser light, the laser light being relatively moved along the planned cutting line, thereby forming a plurality of pairs along the planned cutting line, and each of the minute cavities are separated by a predetermined distance along the planned cutting line.

26. A laser beam machining apparatus comprising:

a laser light source, a mount table for mounting a semiconductor substrate, and a controller for controlling a relative position of the laser light source and the mount table, wherein the controller controls the relative position of the laser light source and the mount table while converging the laser light to the inside of the semiconductor substrate, and the controller move the laser light source and the mount table relatively along a planned cutting line, thereby forming a molten processed area in the semiconductor substrate along the planned cutting line and forming a minute cavity at a predetermined position in connection with the molten processed area in the semiconductor substrate, wherein the laser light is a pulsed laser light, a pair comprising the molten processed area and the minute cavity is formed by irradiating at least 1 pulse of the laser light, the laser light being relatively moved along the planned cutting line, thereby forming a plurality of pairs along the planned cutting line, and each of the minute cavities are separated by a predetermined distance along the planned cutting line.

27. A laser beam machining apparatus comprising:

a laser light source, a mount table for mounting a semiconductor substrate, and a controller for controlling a relative position of the laser light source and the mount table, wherein the controller controls the relative position of the laser light source and the mount table while converging the laser light to the inside of the semiconductor substrate, and the controller moves the laser light source and the mount table relatively along a planned cutting line, thereby forming a molten processed area in the semiconductor substrate along the planned cutting line and forming a minute cavity at a predetermined position in connection with the molten processed area in the semiconductor substrate, the laser light being a pulse laser light in which a pulse width is set to 500 nsec or less, wherein a pair comprising the molten processed area and the minute cavity is formed by irradiating at least 1 pulse of the laser light, the laser light being relatively moved along the planned cutting line, thereby forming a plurality of pairs along the planned cutting line, and each of the minute cavities are separated by a predetermined distance along the planned cutting line.

28. A laser beam machining apparatus comprising:

a laser light source, a mount table for mounting a semiconductor substrate, and a controller for controlling a relative position of the laser light source and the mount table, wherein the controller controls the relative position of the laser light source and the mount table while converging the laser light to the inside of the semiconductor substrate, and the controller moves the laser light source and the mount table relatively along a planned cutting line, thereby forming a molten processed area in the semiconductor substrate along the planned cutting line and forming a minute cavity at a predetermined position in connection with the molten processed area in the semiconductor substrate, the laser light being a pulse laser light in which a pulse pitch is set to 1.00 μm to 7.00 μm, wherein a pair comprising the molten processed area and the minute cavity is formed by irradiating at least 1 pulse of the laser light, the laser light being relatively moved along the planned cutting line, thereby forming a plurality of pairs along the planned cutting line, and each of the minute cavities are separated by a predetermined distance along the planned cutting line.

29. The apparatus according to any one of claims 25-28, wherein the molten processed area is at least one of an area which has been melted and then re-solidified, an area under a melting condition, and an area which was melted and is being re-solidified.

30. The apparatus according to any one of claims 25-28, wherein the molten processed area is a phase-varied area or a crystal-structure varied area.

31. The apparatus according to any one of claims 25-28, wherein the molten processed area is an area in which one of a monocrystal structure, an amorphous structure, and a polycrystal structure is varied with another structure.

32. A laser beam machined product obtained by cutting a machining target by laser beam machining, comprising:
- a treated area which is modified with multiphoton absorption and formed at a portion along a principal face formed by the cutting; and
- a minute cavity having an opening portion formed at a predetermined position which is located on the principal face formed by cutting and corresponds to the treated area, wherein
- the treated area is a molten processed area,
- the laser light is a pulsed laser light,
- a pair comprising the treated area and the minute cavity is formed by irradiating at least 1 pulse of the laser light, the laser light being relatively moved along a planned cutting line, thereby forming a plurality of pairs along the planned cutting line, and
- each of the minute cavities are separated by a predetermined distance along the planned cutting line.

33. The laser beam machined product according to claim 32, wherein an interval between the minute cavities is 1.00 μm to 7.00 μm.

34. The laser beam machined product according to claim 32, wherein the treated area is formed in a first zone along the planned cutting line, and the minute cavities are formed in a second zone separated from the first zone.

35. A laser beam machined product obtained by cutting a machining target by laser beam machining, comprising:
- a treated region which includes a treated area which is formed at a portion along a principal face formed by the cutting; and
- a minute cavity region which includes a minute cavity having an opening portion formed at a predetermined position which is located on the principal face formed by cutting, wherein
- the treated area is a molten processed area,
- the laser light is a pulsed laser light,
- a pair comprising the treated area and the minute cavity is formed by irradiating at least 1 pulse of the laser light, the laser light being relatively moved along a planned cutting line, thereby forming a plurality of pairs along the planned cutting line, and
- each of the minute cavities are separated by a predetermined distance along the planned cutting line.

36. The product according to any one of claims 32 and 35, wherein the molten processed area is at least one of an area which has been melted and then re-solidified, an area under a melting condition, and an area which was melted and is being re-solidified.

37. The product according to any one of claims 32 and 35, wherein the molten processed area is a phase-varied area or a crystal-structure varied area.

38. The product according to any one of claims 32 and 35, wherein the molten processed area is an area in which one of a monocrystal structure, an amorphous structure, and a polycrystal structure is varied with another structure.

* * * * *